US011528367B2

(12) United States Patent
Hamada

(10) Patent No.: US 11,528,367 B2
(45) Date of Patent: Dec. 13, 2022

(54) IMAGE READING APPARATUS INDICATING READING FOR OCR PROCESSING FAILURE BASED ON AMOUNT OF DOCUMENT TILT

(71) Applicant: CANON KABUSHIKI KAISHA, Tokyo (JP)

(72) Inventor: Kaoru Hamada, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/327,506

(22) Filed: May 21, 2021

(65) Prior Publication Data
US 2021/0377395 A1 Dec. 2, 2021

(30) Foreign Application Priority Data

Jun. 1, 2020 (JP) .............................. JP2020-095698

(51) Int. Cl.
*H04N 1/00* (2006.01)
*H04N 1/387* (2006.01)

(52) U.S. Cl.
CPC ..... *H04N 1/00034* (2013.01); *H04N 1/00005* (2013.01); *H04N 1/00087* (2013.01); *H04N 1/00718* (2013.01); *H04N 1/00769* (2013.01); *H04N 1/00824* (2013.01); *H04N 1/3878* (2013.01)

(58) Field of Classification Search
CPC .......... H04N 1/00331; H04N 1/00718; H04N 1/00769; H04N 1/00824; H04N 1/3878; G06T 3/608; G06K 9/00503; G06V 10/243; G06V 30/1463; G06V 30/1607; G06V 30/20

See application file for complete search history.

(56) References Cited

U.S. PATENT DOCUMENTS

| 5,729,635 A | * | 3/1998 | Fast | G06V 30/164 |
| | | | | 382/245 |
| 5,778,103 A | * | 7/1998 | Allan | G06V 30/155 |
| | | | | 382/254 |
| 5,895,928 A | * | 4/1999 | Kerschner | H04N 1/00689 |
| | | | | 250/559.39 |

(Continued)

FOREIGN PATENT DOCUMENTS

| JP | 2014-096154 A | 5/2014 |
| WO | WO-2018101000 A1 * | 6/2018 |

*Primary Examiner* — Scott A Rogers

(74) *Attorney, Agent, or Firm* — Canon U.S.A., Inc. I.P. Division

(57) ABSTRACT

An image reading apparatus includes a conveyance unit and a reading unit. Based on read image data from the reading unit, a tilt amount of an edge of a document on a leading edge side in a conveyance direction in which the document is conveyed is decided. If the decided tilt amount exceeds a first threshold where a setting that performs document digitalization with respect to the image data, notification is given of information indicating that reading of the document for the document digitalization has failed. If the decided tilt amount is smaller than the first threshold, skew correction is executed for correcting the tilt amount based on the decided tilt amount with respect to the image data, and the document digitalization is executed with respect to the image data for which the skew correction has been executed.

7 Claims, 15 Drawing Sheets

(56) References Cited

U.S. PATENT DOCUMENTS

| | | | | |
|---|---|---|---|---|
| 5,987,171 | A * | 11/1999 | Wang | G06V 30/40 |
| | | | | 382/173 |
| 7,305,619 | B2 * | 12/2007 | Kaneda | H04N 1/3877 |
| | | | | 715/764 |
| 7,692,824 | B2 * | 4/2010 | Shirai | H04N 1/00793 |
| | | | | 399/367 |
| 8,233,201 | B2 * | 7/2012 | Toyoda | H04N 1/00748 |
| | | | | 358/488 |
| 8,588,549 | B2 * | 11/2013 | Yi | H04N 1/00087 |
| | | | | 358/448 |
| 8,718,365 | B1 * | 5/2014 | Bissacco | G06V 10/242 |
| | | | | 382/175 |
| 9,076,242 | B2 * | 7/2015 | Baheti | H04N 5/23222 |
| 9,100,608 | B2 * | 8/2015 | Yamada | H04N 1/387 |
| 10,055,801 | B2 * | 8/2018 | Smith | H04L 67/10 |
| 10,110,776 | B2 * | 10/2018 | Sunada | H04N 1/00718 |
| 10,225,431 | B2 * | 3/2019 | Smith | H04N 1/3878 |
| 10,321,014 | B2 * | 6/2019 | Tagami | H04N 1/00779 |
| 10,897,549 | B2 * | 1/2021 | Shiota | B65H 5/062 |
| 11,302,108 | B2 * | 4/2022 | Hoehne | G06N 20/00 |
| 2006/0165292 | A1 * | 7/2006 | Li | H04N 1/00745 |
| | | | | 382/199 |
| 2010/0141991 | A1 * | 6/2010 | Yoshida | H04N 1/3878 |
| | | | | 358/1.18 |

* cited by examiner

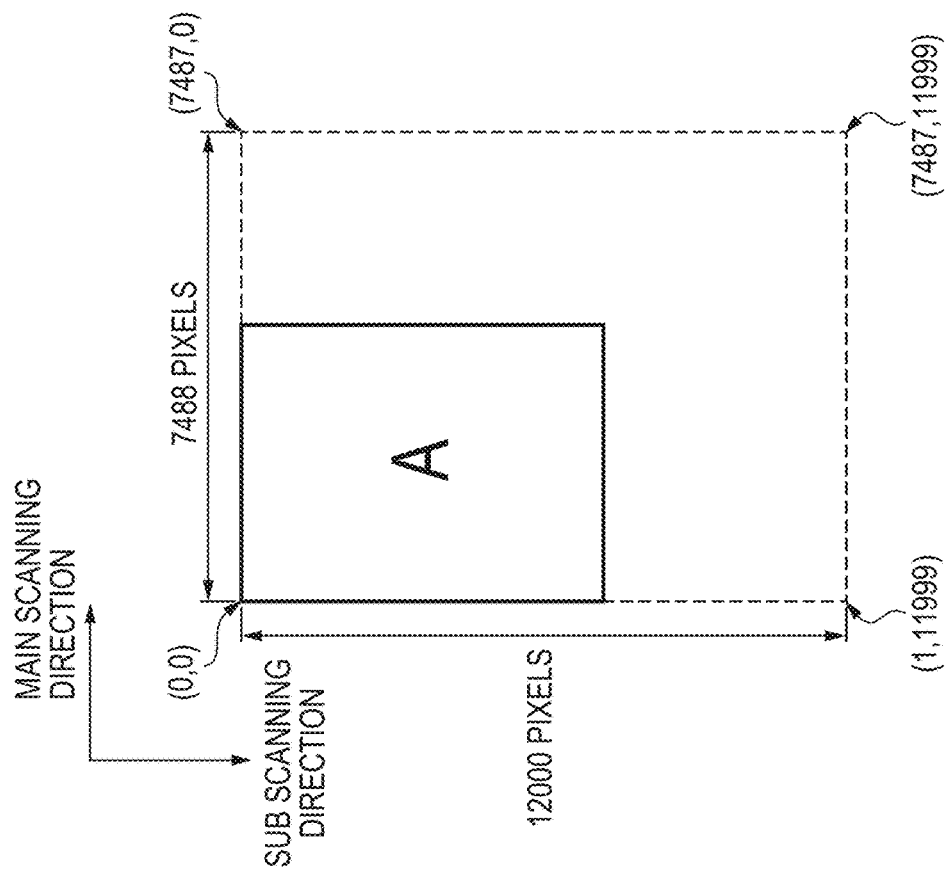
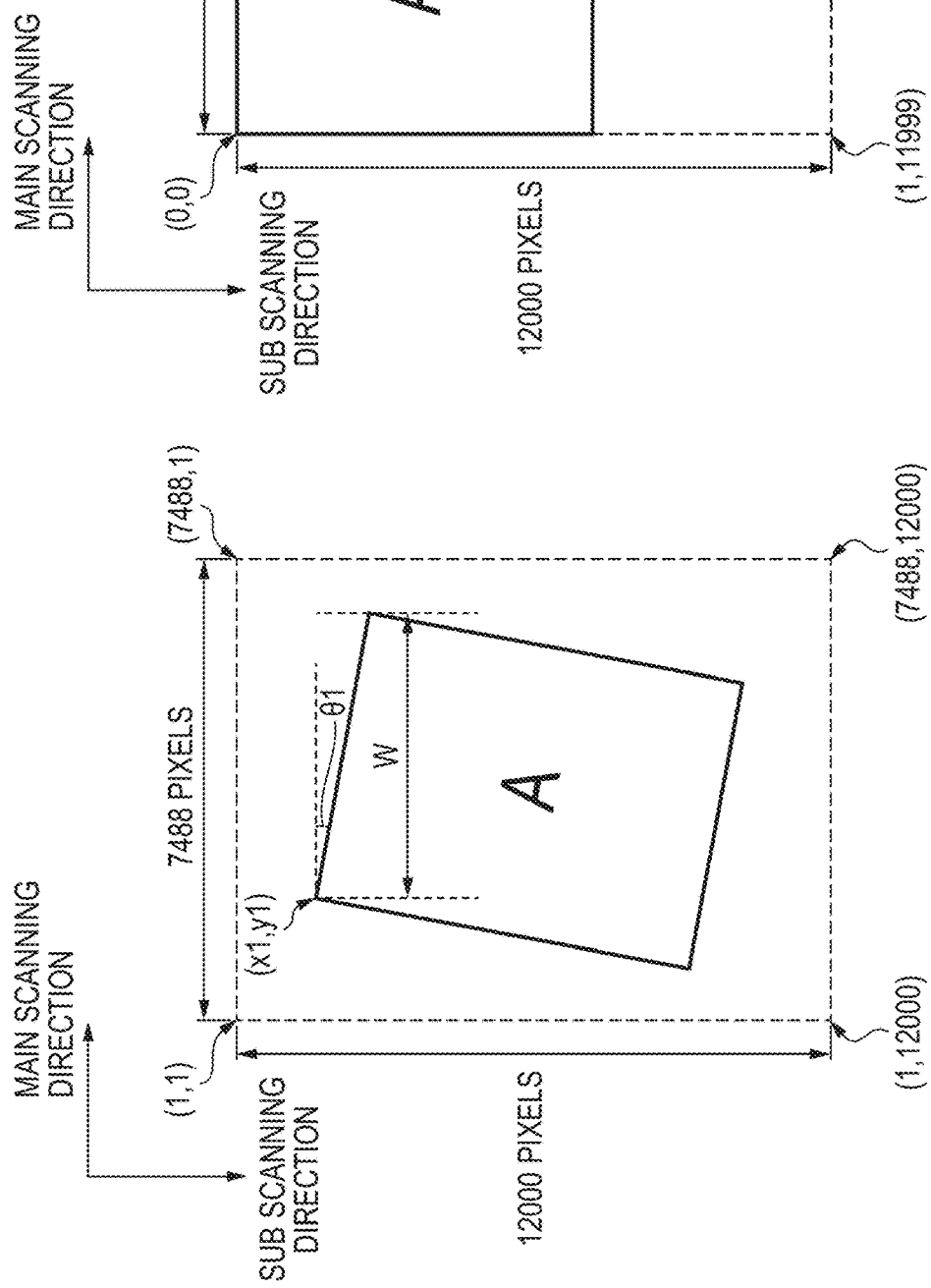

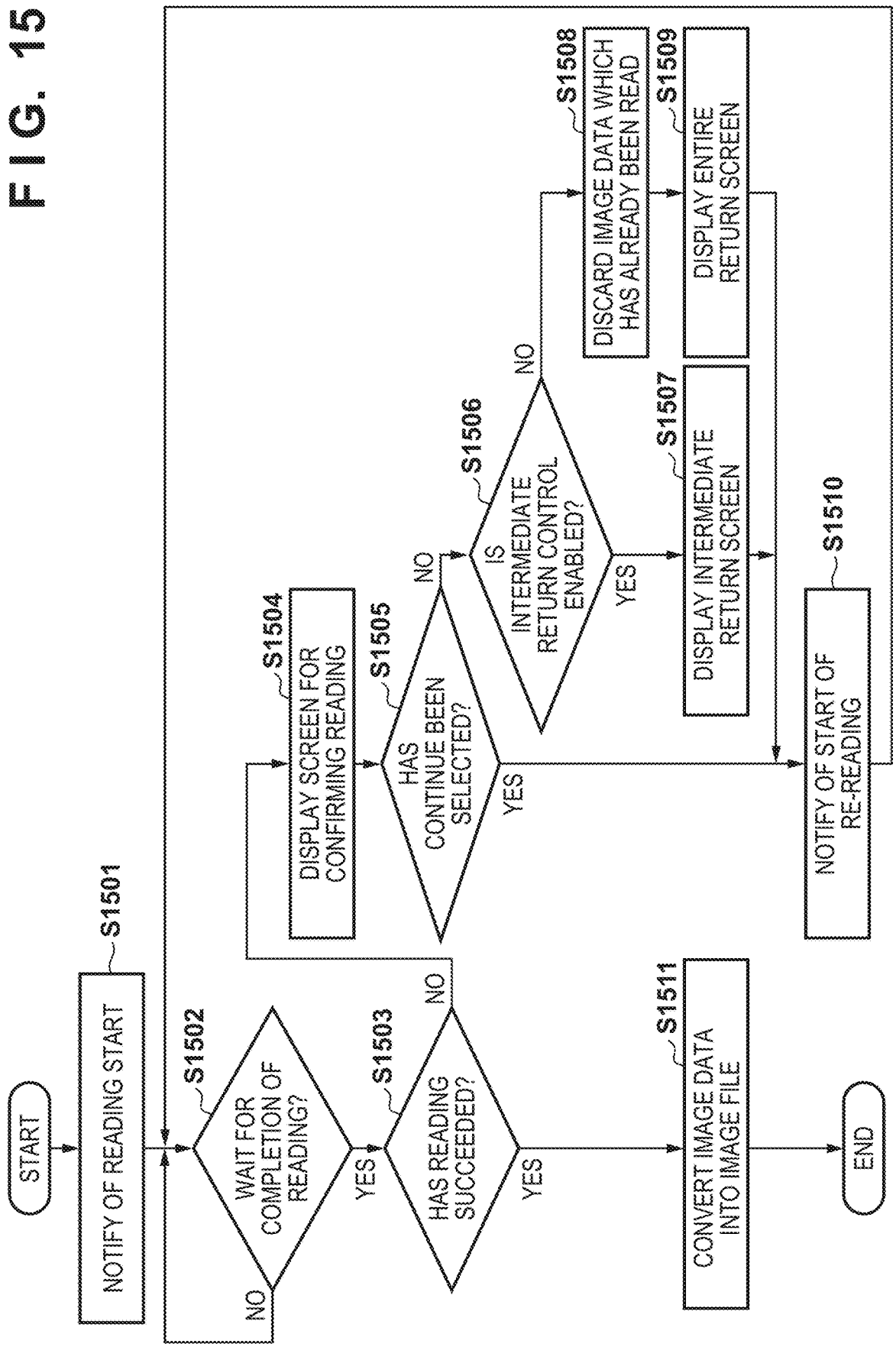

IMAGE READING APPARATUS INDICATING READING FOR OCR PROCESSING FAILURE BASED ON AMOUNT OF DOCUMENT TILT

BACKGROUND

Field

The present disclosure relates to an image reading apparatus.

Description of the Related Art

Conventionally, an image reading apparatus is known that conveys the documents placed on a document tray one-by-one, and performs feed scanning whereby an image of a conveyed document is read by an image sensor.

Also, Japanese Patent Laid-Open No. 2014-96154 describes document digitalization, such as optical character recognition (hereinafter, OCR) processing for extracting text data from image data that indicates an image read by an image reading apparatus. In OCR processing, characters are distinguished by comparing the obtained image data with character patterns that have been stored in a memory in advance.

When feed scanning is performed, there is a possibility that an image of a document is read in a state where the leading edge of the document is tilted (the document is skewed) relative to the direction perpendicular to the conveyance direction of the document (hereinafter, a main scanning direction) due to variations in the nip pressures and the rotation speeds of rollers that are used in conveyance of the document. As a result, there is a possibility that the read image is tilted relative to the main scanning direction.

In a case where OCR processing is performed with respect to an image obtained through feed scanning, if an image of a document is read in a state where this document is skewed, there is a possibility that the accuracy of recognition of characters decreases.

Regarding whether characters have been erroneously recognized in OCR processing, a user needs to confirm digitalized document data for which the OCR processing has been completed, and determine whether character recognition has failed. In a case where characters have been erroneously recognized, the user needs to search for a document that has failed in reading from a bundle of discharged documents, in order to re-read the document that has failed in the OCR processing. Alternatively, all of the bundle of discharged documents need to be re-read from the start. That is to say, in a case where OCR processing is performed with respect to an image obtained through feed scanning, the usability decreases when the OCR processing has failed.

SUMMARY

A feature of the present disclosure is to provide a technique to suppress a decrease in the usability on an image reading apparatus that performs document digitalization.

According to an aspect of the present disclosure, an image reading apparatus comprising: a conveyance unit configured to convey a document, a reading unit configured to read the document conveyed by the conveyance unit, and to generate image data indicating an image of the document, a notification unit configured to notify a user of information, and one or more controllers configured to perform operations including: deciding, based on the image data, a tilt amount of an edge of the document on a leading edge side in a conveyance direction in which the document is conveyed, wherein the tilt amount corresponds to an angle of tilt to a predetermined direction perpendicular to the conveyance direction, controlling, in a case where the decided tilt amount exceeds a first threshold in a case of a setting that performs document digitalization with respect to the image data, the notification unit so as to give notification of information indicating that reading of the document for the document digitalization has failed, and executing, in a case where the decided tilt amount is smaller than the first threshold in the case of the setting that performs the document digitalization, skew correction for correcting the tilt amount based on the decided tilt amount with respect to the image data, and executing the document digitalization with respect to the image data for which the skew correction has been executed.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

FIG. 5 is a diagram for describing a tilt of a document at the time of reading of the document.

FIG. 6 is a diagram showing an exemplary image indicated by binarized data input to a document information determination unit.

FIG. 15 is a flowchart for describing feed scanning control performed by a system controller of the document reading apparatus according to the third embodiment.

DESCRIPTION OF THE EMBODIMENTS

Embodiments of the present disclosure will be described hereinafter in detail, with reference to the accompanying drawings. It is to be understood that the following embodiments are not intended to limit the claims of the present disclosure, and that not all of the combinations of the aspects that are described according to the following embodiments are necessarily required. Also, a plurality of features may be arbitrarily combined.

With reference to the drawings, the following describes an exemplary configuration of an automatic document reading apparatus according to embodiments as one example of an image reading apparatus of the present disclosure.

First Embodiment

[Image Forming Apparatus]

Figure 1:
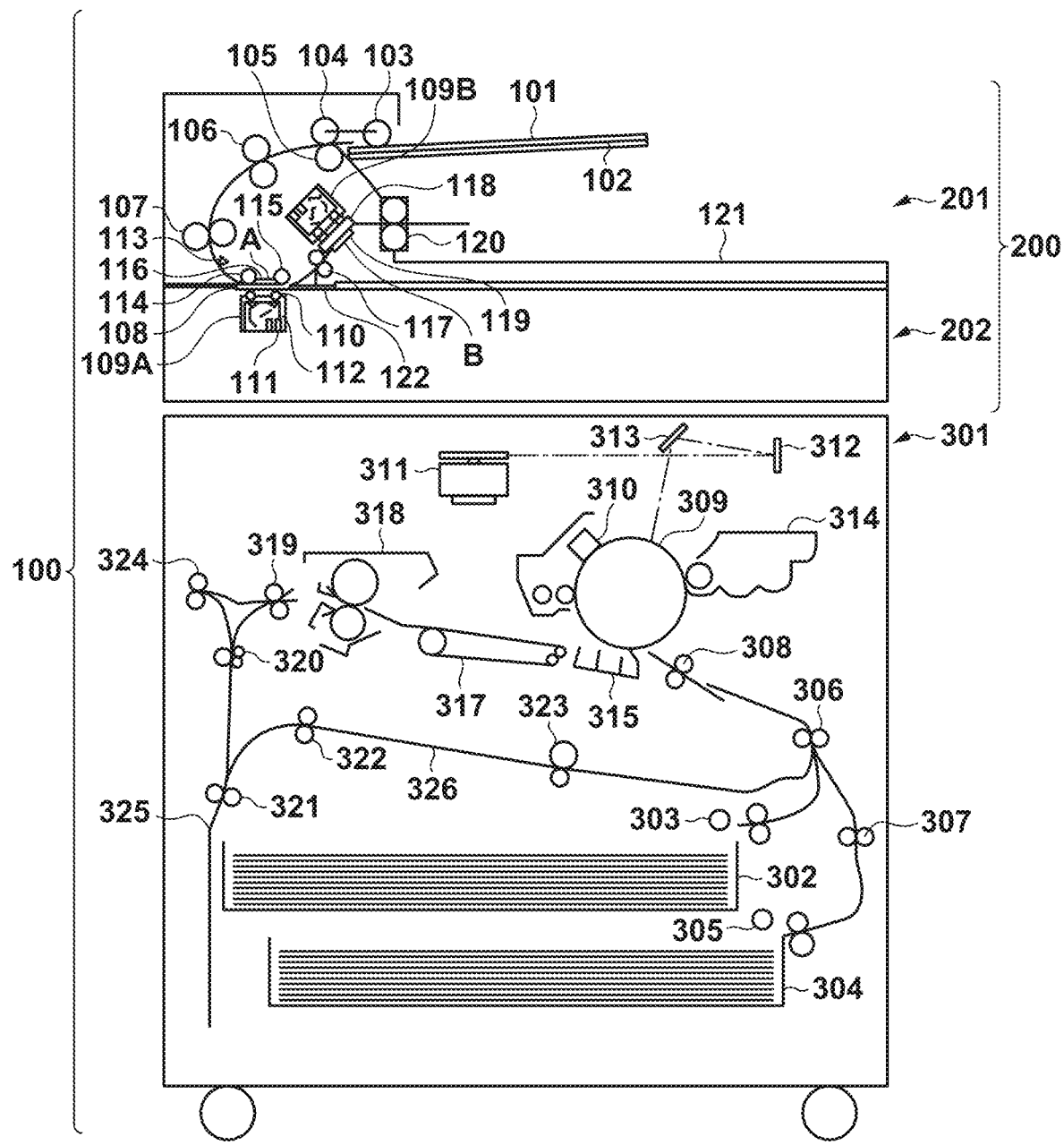
FIG. 1 depicts a perspective view showing an exemplary external appearance of an image forming apparatus according to a first embodiment of the present disclosure.

FIG. 1 depicts a cross-sectional view showing a configuration of a copy machine (hereinafter referred to as an image forming apparatus) 100 based on a monochrome electro-photographic method used in the present embodiment. Note that the image forming apparatus is not limited to a copy machine, and may also be, for example, a facsimile apparatus, a printing machine, a printer, or the like. Furthermore, the printing method is not limited to an electro-photographic method, and may also be, for example, an inkjet or the like. Moreover, the type of the image forming apparatus may be either a monochrome type or a color type.

The following describes the configuration and functions of the image forming apparatus 100 with use of FIG. 1. As shown in FIG. 1, the image forming apparatus 100 includes an image reading apparatus 200, which includes a document feeding unit 201 and a reading device 202, and an image printing apparatus 301. The document feeding unit 201 is rotatable relative to the reading device 202.

<Image Reading Apparatus>

A pickup roller 103 as a feeding unit feeds a document 101 loaded on a feeding tray 102 as a stacking unit to the inside of the document feeding unit 201. Separation rollers 104 and 105 are provided to prevent the pickup roller 103 from feeding a plurality of documents 101 simultaneously. The document 101 fed onto a conveyance path is conveyed by a conveyance roller 106 and a reading roller 107 toward a reading position A. Note that the separation rollers 104, 105, the conveyance roller 106, and the reading roller 107 are included in a conveyance unit.

A transparent glass 108 is placed at the reading position A, and a reading unit 109A is provided on the side that opposes the glass 108 via the conveyance path. The reading unit 109A includes an LED 110, an image sensor 111, and optical components 112. The image sensor 111 includes a plurality of pixels which extend along the main scanning direction and which receive R (red), G (green), and B (blue) light.

Figure 2:
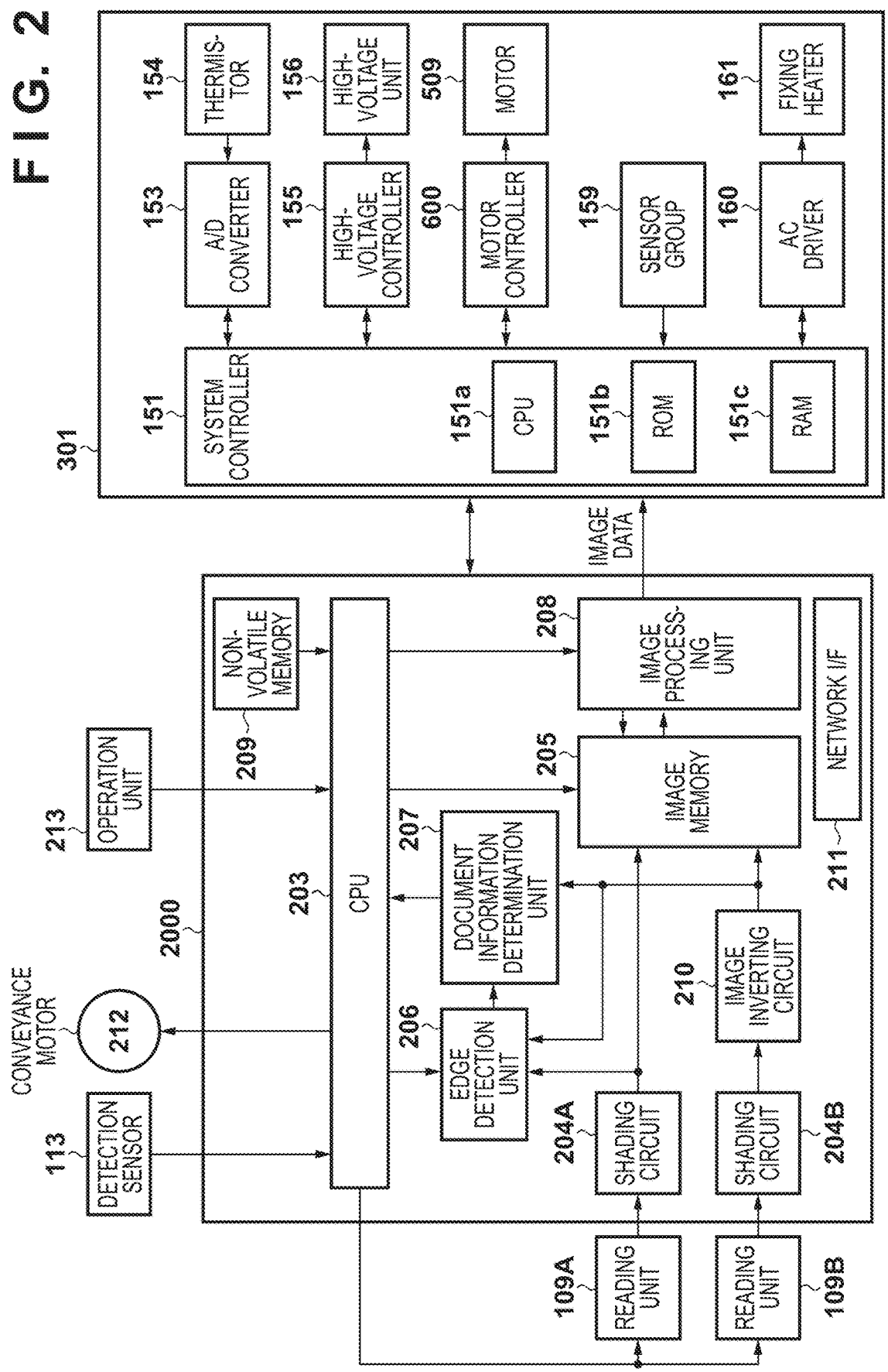
FIG. 2 is a block diagram for describing exemplary control configurations of the image forming apparatus according to the first embodiment.

The reading unit 109A reads an image of a front surface (first surface) of the document 101 as follows. Specifically, the LED 110 as a light source irradiates the front surface of the document 101 with light (light projection) via the glass 108. The optical components 112 direct reflected light from the document 101, which is received via the glass 108, to the image sensor 111. The image sensor 111 outputs analog image signal based on the received reflected light. Note that the image sensor 111 reads, at a time, an image corresponding to one line extending along the main scanning direction. Therefore, while the document 101 is conveyed, reading of an image corresponding to one line is performed by the image sensor 111 multiple times; in this way, the image sensor 111 can output an image signal that contains the entire document 101. A non-illustrated A/D conversion unit of the reading unit 109A converts the analog image signal into digital image data, and outputs the digital image data to a controller 2000 (FIG. 2).

A detection sensor 113 that detects the document 101 is provided upstream relative to the reading position A in the conveyance direction of the document 101. Based on a timing at which the detection sensor 113 detected the document 101, the controller 2000 determines a timing at which the reading unit 109A starts reading of the document 101.

Pressing rollers 114 and 115 press the document 101 against the glass 108. Note that a white guide plate 116 as an opposing member is placed at a position which is between the pressing rollers 114 and 115 and which faces the reading unit 109A, that is to say, on the side that opposes the reading unit 109A via the conveyance path on which the document is conveyed.

The document 101 that has passed through the reading position A is conveyed by a conveyance roller 117 toward a reading position B. A transparent glass 118 is placed at the reading position B, and a reading unit 109B is provided on the side that opposes the glass 118 via the conveyance path. The reading unit 109B is configured similarly to the reading unit 109A, and reads an image of a back surface (second surface) of the document 101. A timing at which the reading unit 109B starts reading, too, is determined based on a timing at which the detection sensor 113 detected the document. A white guide plate 119 is placed at a position that faces the reading unit 109B. The document 101 that has passed through the reading position B is discharged by a discharge roller 120 onto a discharge tray 121. A white reference plate 122, which is a reference reading member used in the obtainment of shading data, is provided on the right side of the glass 108.

<Image Printing Apparatus>

Sheet storage trays 302, 304 are provided inside the image printing apparatus 301. Different types of recording mediums can be stored respectively in the sheet storage trays 302, 304. For example, A4-size plain paper may be stored in the sheet storage tray 302, and A4-size cardboard may be stored in the sheet storage tray 304. Note that recording mediums denote items on which an image is formed by the image forming apparatus; for example, a sheet of paper, a resin sheet, a cloth, an OHP sheet, a label, and the like are included in recording mediums.

A recording medium stored in the sheet storage tray 302 is fed by a pickup roller 303, and sent to a registration roller 308 by a conveyance roller 306. Also, a recording medium stored in the sheet storage tray 304 is fed by a pickup roller 305, and sent to the registration roller 308 by conveyance rollers 307 and 306.

Image data output from the image reading apparatus 200 is input to an optical scanning apparatus 311, which includes a semiconductor laser and a polygonal mirror. Also, a charger 310 charges the outer circumferential surface of a photosensitive drum 309. After the outer circumferential surface of the photosensitive drum 309 has been charged, the optical scanning apparatus 311 irradiates the outer circumferential surface of the photosensitive drum 309 with laser light corresponding to an image signal, which has been input from the image reading apparatus 200 to the optical scanning apparatus 311, via the polygon mirror and mirrors 312, 313. As a result, an electro-static latent image is formed on the outer circumferential surface of the photosensitive drum 309.

Next, the electro-static latent image is developed by toner inside a developer 314, and a toner image is formed on the outer circumferential surface of the photosensitive drum 309. The toner image formed on the photosensitive drum 309 is transferred to the recording medium by a transfer charger 315 provided at a position that opposes the photosensitive drum 309 (a transfer position). The registration roller 308 sends the recording medium to the transfer position in accordance with a transfer timing at which the transfer charger 315 transfers the image to the recording medium.

The recording medium to which the toner image has been transferred in the foregoing manner is sent to a fixing unit 318 by a conveyance belt 317, and the toner image is fixed to the recording medium by heat and pressure applied to the recording medium by the fixing unit 318. In this way, the image forming apparatus 100 forms an image on a recording medium.

In a case where image formation is performed in a single-sided print mode, the recording medium that has passed through the fixing unit 318 is discharged to a non-illustrated discharge tray by discharge rollers 319, 324. On the other hand, in a case where image formation is performed in a double-sided print mode, after the fixing unit 318 has performed fixing processing with respect to the first surface of the recording medium, the recording medium is conveyed to an inverting path 325 by the discharge roller 319, a conveyance roller 320, and an inverting roller 321. Thereafter, the recording medium is conveyed to the registration roller 308 by conveyance rollers 322, 323 via a double-sided conveyance path 326, and an image is formed on the second surface of the recording medium based on the above-described method. Thereafter, the recording medium is discharged to a non-illustrated discharge tray by the discharge rollers 319, 324.

Furthermore, in a case where the recording medium with an image formed on the first surface thereof is to be discharged face-down to the outside of the image forming apparatus 100, the recording medium that has passed through the fixing unit 318 is conveyed in the direction toward the conveyance roller 320 via the discharge roller 319. Thereafter, the rotation of the conveyance roller 320 is inverted immediately before the trailing edge of the recording medium passes through a nip portion of the conveyance roller 320; as a result, the recording medium is discharged to the outside of the image forming apparatus 100 via the discharge roller 324 in a state where the first surface of the recording medium is facing down.

The configuration and functions of the image forming apparatus 100 are as described above.

<Control Configurations>

FIG. 2 is a block diagram for describing examples of control configurations of the image forming apparatus 100 according to the first embodiment. First, a control configuration of the image printing apparatus 301 will be described.

As shown in FIG. 2, a system controller 151 of the image printing apparatus 301 includes a CPU 151a, a ROM 151b, and a RAM 151c. Also, the system controller 151 is connected to an analog/digital (A/D) converter 153, a high-voltage controller 155, a motor controller 600, a sensor group 159, and an AC driver 160. The system controller 151 can exchange data and commands with each unit connected thereto.

The CPU 151a executes various types of sequences related to a predetermined image forming sequence by reading out and executing various types of programs stored in the ROM 151b.

The RAM 151c is a storage device. The RAM 151c stores, for example, various types of data, such as setting values for the high-voltage controller 155 and instruction values for the motor controller 600.

The system controller 151 receives signals from the sensor group 159, and sets the setting values for the high-voltage controller 155 based on the received signals.

The high-voltage controller 155 supplies necessary voltage to a high-voltage unit 156 (the charger 310, the developer 314, the transfer charger 315, etc.) in accordance with the setting values set by the system controller 151.

The motor controller 600 controls a motor 509, which drives the loads provided in the image printing apparatus 301, in accordance with instructions output from the CPU 151a.

The A/D converter 153 receives a detection signal detected by a thermistor 154, which is intended to detect the temperature of a fixing heater 161, converts the detection signal from an analog signal into a digital signal, and transmits the digital signal to the system controller 151. The system controller 151 controls the AC driver 160 based on the digital signal received from the A/D converter 153. The AC driver 160 controls the fixing heater 161 so that the temperature of the fixing heater 161 matches the temperature that is necessary for performing the fixing processing. Note that the fixing heater 161 is a heater used in the fixing processing, and is included in the fixing unit 318.

In the foregoing manner, the system controller 151 controls operation sequences of the image forming apparatus 100.

Next, a control configuration of the image reading apparatus 200 will be described. A CPU 203 controls the image reading apparatus 200 by executing a program stored in a nonvolatile memory 209.

A conveyance motor 212 is a driving source for each roller provided in the document feeding unit 201, and is rotatably driven under control of the controller 2000.

An operation unit 213 provides user interfaces. The CPU 203 controls the operation unit 213 so as to display, on a display unit provided in the operation unit 213, an operation screen that allows a user to set, for example, the type of a recording medium to be used (hereinafter referred to as a paper type). The CPU 203 receives information set by the user from the operation unit 213, and outputs the information set by the user to the system controller 151.

The system controller 151 transmits information indicating the state of the image forming apparatus 100 to the operation unit 213. Note that the information indicating the state of the image forming apparatus 100 is, for example, information related to the number of sheets on which images are to be formed, the status of progress of an image forming operation, a jam and multi-feeding of sheets in the image printing apparatus 301 and the document feeding unit 201, and the like. The operation unit 213 displays the information received from the system controller 151 on the display unit.

The reading units 109A and 109B output digital image data to the controller 2000. A numerical value of this image data increases as the intensity of reflected light increases. Hereinafter, this numerical value level is referred to as a luminance level. Furthermore, hereinafter, image data output from the reading unit 109A is denoted as front-surface image data, whereas image data output from the reading unit 109B is denoted as back-surface image data.

The front-surface image data output from the reading unit 109A is input to a shading circuit 204A, and the back-surface image data output from the reading unit 109B is input to a shading circuit 204B. The shading circuits 204A and 204B correct the influence of non-uniformity in the light amount of the LED 110 and unevenness in the sensitivities of respective pixels in the image sensor 111 by performing calculation involving addition/subtraction and multiplication/division with respect to image data (shading correction), thereby generating image data that is uniform in the main scanning direction.

The front-surface image data after the shading correction performed by the shading circuit 204A is stored to an image memory 205. On the other hand, the back-surface image data after the shading correction performed by the shading circuit 204B is input to an image inverting circuit 210.

The image inverting circuit 210 inverts the main scanning direction of the back-surface image data. This is because, in the present embodiment, the reading unit 109A and the reading unit 109B are configured in a similar manner, and an image read by the reading unit 109B is inverted in the main scanning direction relative to an image read by the reading unit 109A. The back-surface image data after the processing performed by the image inverting circuit 210 is stored to the image memory 205.

Figure 7:
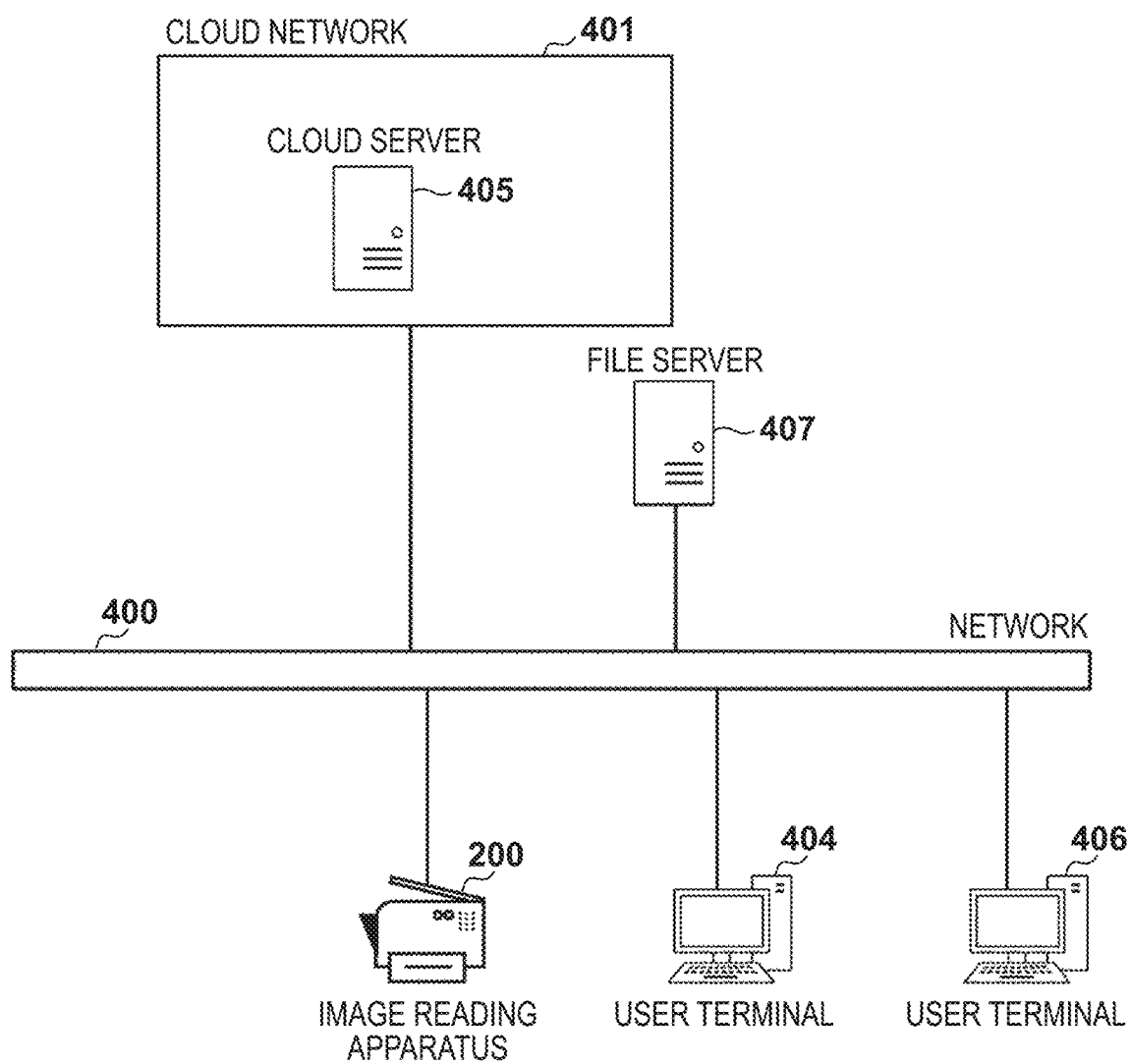
FIG. 7 is a diagram showing a configuration of an information processing system according to the first embodiment.

The image reading apparatus 200 is connected to an information processing system constructed via a network 400, which is shown in FIG. 7, via a network IF 211.

Figure 3:
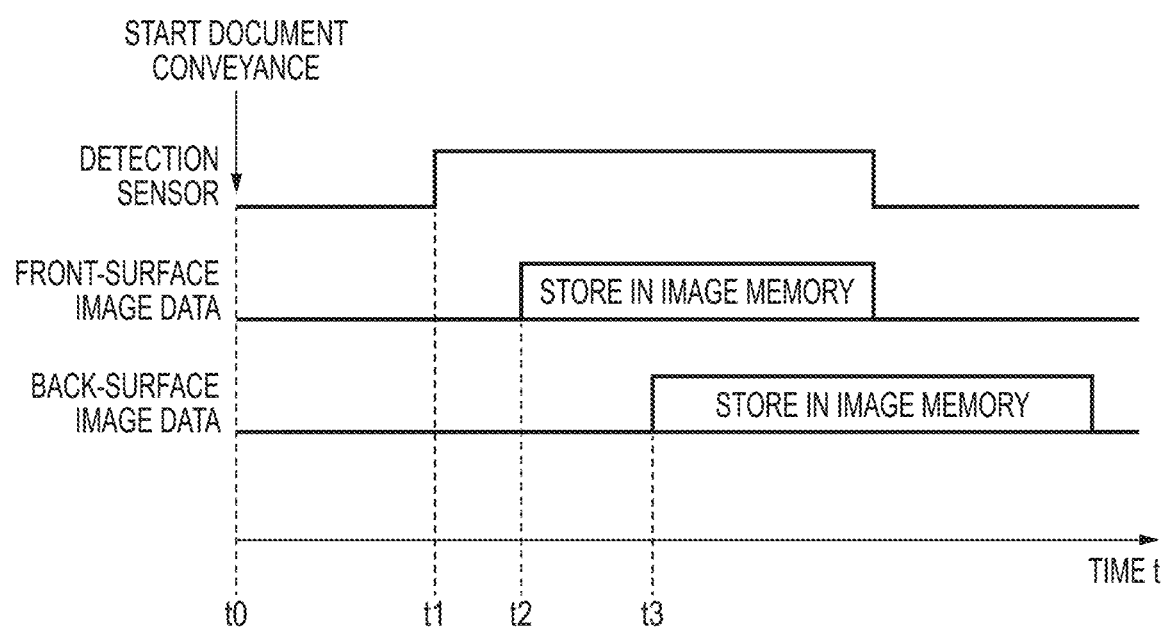
FIG. 3 is an explanatory diagram for describing timings of obtainment of front-surface image data and back-surface image data stored in an image memory.

FIG. 3 is an explanatory diagram for describing timings of obtainment of front-surface image data and back-surface image data stored in the image memory 205.

After the conveyance of the document 101 is started at time t0, the detection sensor 113 detects the leading edge of the document 101 at time t1. The CPU 203 determines time t2, which precedes the arrival of the document 101 at the reading position A based on the time t1, based on the conveyance speed at which the document 101 is conveyed, for example. Then, the CPU 203 stores front-surface image data output from the reading unit 109A to the image memory 205 for a predetermined time period from time t2. Note, it is assumed that this predetermined time period is a period until at least the trailing edge of the document 101 goes past the reading position A. This predetermined time period is obtained based on the conveyance speed of the document 101. Similarly, the CPU 203 determines time t3, which precedes the arrival of the document 101 at the reading position B based on time t1. Then, the CPU 203 stores back-surface image data output from the reading unit 109B in the image memory 205 for a predetermined time period from time t3. Note that the CPU 203 may start the reading performed by the reading unit 109A and store the front-surface image data in the image memory 205 at time t2, or may store the front-surface image data from the reading unit 109A that performs the reading from before time t2 in the image memory 205. Also, the CPU 203 may start the reading performed by the reading unit 109B and store the back-surface image data in the image memory 205 at time t3, or may store the back-surface image data from the reading unit 109B that performs the reading from before time t3 in the image memory 205. Note that in the following description, it is assumed that an image indicated by front-surface image data is also referred to as a front-surface image, and an image indicated by back-surface image data is also referred to as a back-surface image.

As shown in FIG. 2, the front-surface image data output from the shading circuit 204A is also input to an edge detection unit 206. Furthermore, the back-surface image data output from the image inverting circuit 210 is also input to the edge detection unit 206. While the following describes correction of front-surface image data, back-surface image data is also corrected in a similar manner.

Figure 4A:
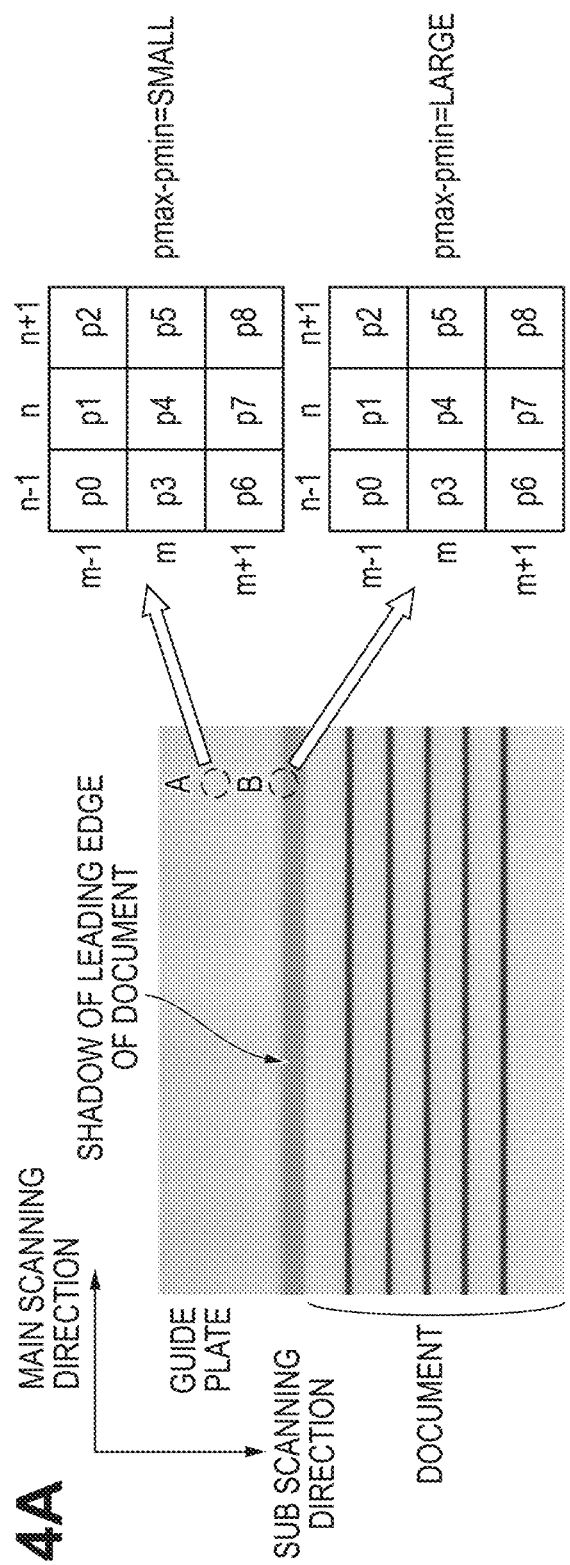
FIGS. 4A and 4B are explanatory diagrams of processing performed by an edge detection unit.
Figure 4B:
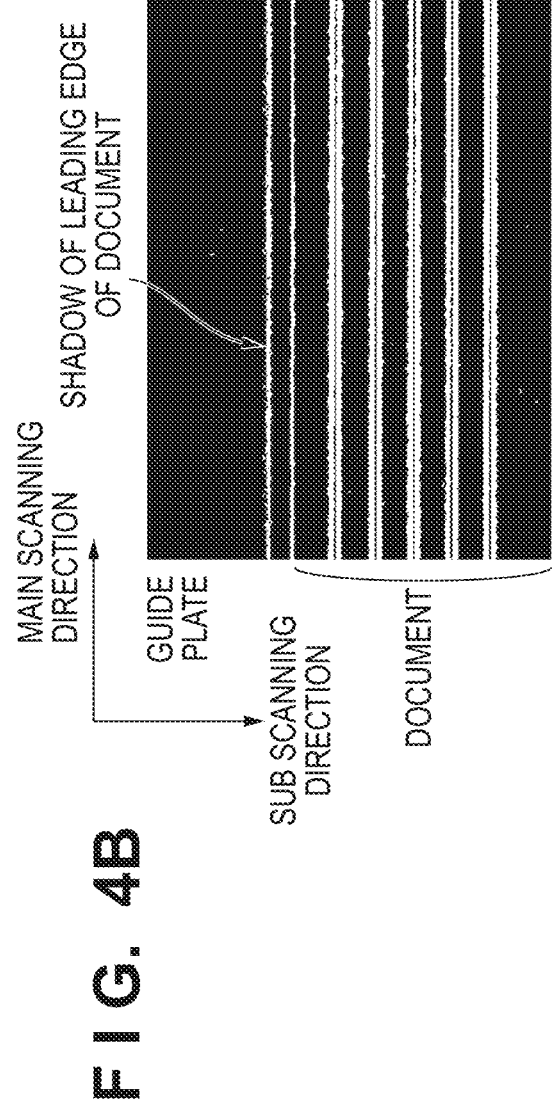

FIGS. 4A, 4B are explanatory diagrams of processing performed by the edge detection unit 206. FIGS. 4A, 4B show views illustrating an image obtained by combining, in the sub scanning direction, pixel columns along the main scanning direction that were obtained by the reading unit 109A from time t2 at a predetermined time interval.

As stated earlier, the front-surface image data input to the edge detection unit 206 is data from time t2, which precedes the arrival of the leading edge of the document 101 at the reading position A in the conveyance direction. That is to say, once the reading unit 109A has started reading an image, the guide plate 116 is read first. Thereafter, an image of the document 101 is read as the document 101 is conveyed. That is to say, the front-surface image data input to the edge detection unit 206 includes image data indicating the guide plate 116 and image data indicating an edge of the document 101 on the leading edge side.

The edge detection unit 206 executes binarization processing with respect to the front-surface image data while regarding a region corresponding to a total of nine pixels, which are composed of three pixels in the main scanning direction and three pixels in the sub scanning direction, as one block. Hereinafter, it is assumed that the number of pixels in the reading units 109A and 109B in the main scanning direction is 7488, and the reading units 109A and 109B perform the reading 12000 times during the aforementioned predetermined time period. Also, a pixel position in the main scanning direction is denoted as n ($0 \leq n \leq 7487$), and a pixel position in the sub scanning direction is denoted as m ($0 \leq m \leq 11999$). Furthermore, it is assumed that the luminance values of nine pixels in one block are px (x=0 to 8), and the maximum value and the minimum value thereof are denoted as pmax and pmin, respectively.

In an area where all nine pixels correspond to the guide plate 116 (white), as with point A in FIG. 4A, all nine pixels represent white pixels, and thus the difference between pmax and pmin has a small value. On the other hand, on a boundary between the guide plate 116 (white) and the shadow (gray) of the edge of the document 101 on the leading edge side, as with point B of FIG. 4A, white pixels and gray pixels coexist among nine pixels, and thus the difference between pmax and pmin is large. Therefore, when the difference between pmax and pmin is larger than a predetermined threshold pth, it can be determined that the block includes a pixel that serves as a candidate for the shadow created by the edge of the document 101 on the leading edge side (hereinafter referred to as a candidate pixel). In the first embodiment, when the difference between pmax and pmin inside a block is larger than the predetermined threshold pth, the central pixel of this block (the pixel at the coordinates (n, m)) is determined to be the candidate pixel. The edge detection unit 206 performs this determination processing with respect to each n and each m, except for n=0, n=7487, m=0, and m=11999. Note that in the first embodiment, one scale on the x-axis and y-axis corresponds to a distance between the central positions of two neighboring pixels.

FIG. 4A depicts a view illustrating an image indicated by image data of 8 bits (luminance levels: 0 to 255), and FIG. 4B depicts a view illustrating an image indicated by image data that has been obtained by binarizing the image data of the image of FIG. 4A based on a threshold pth=14. White portions in FIG. 4B represent row of pixels that have been determined to be the candidates for the shadow created by the edge of the document 101 on the leading edge side through the aforementioned processing. Among the plurality of candidate pixels shown in FIG. 4B, a row of candidate pixels along the main scanning direction that is closest to the leading edge side in the sub scanning direction (an uppermost row of pixels along the main scanning direction that was determined to be the candidate pixels first in the sub scanning direction) is determined to be the shadow created by the edge, or the end portion, of the document 101 on the leading edge side.

As shown in FIG. 2, binarized data output from the edge detection unit 206 is input to a document information determination unit 207.

FIG. 5 is a diagram illustrating a tilt of a document at the time of reading of the document.

FIG. 6 is a diagram showing an exemplary image indicated by binarized data input to the document information determination unit 207.

The image indicated by the binarized data input to the document information determination unit 207 is an image in a range indicated by a dash line of FIG. 6, and includes the document 101. This range of the dash line is represented by n=0 to 7487, m=0 to 11999.

The document information determination unit 207 determines document information of the front surface (hereinafter, front-surface document information) based on the input binarized data. The document information determination unit 207 also determines the distance (width) W in the main scanning direction between two corner portions of the document 101 on the leading edge side. Then, the document information determination unit 207 outputs the front-surface document information and the width W to the CPU 203. Here, the front-surface document information is information that includes the position and the angle of the document in the front-surface image. Note that the position of the document 101 is the position (x1, y1) represented by a first position of the document 101 inside the front-surface image. In the present embodiment, it is assumed that this first position is one corner portion (on the left side of FIG. 5) included among the two corner portions of the document 101 on the leading edge side. Also, the angle of the document 101 is the angle of a predetermined edge of the document 101 inside the front-surface image relative to a reference direction of the front-surface image. In the present embodiment, it is assumed that this predetermined edge is the edge of the document 101 on the leading edge side, and the reference direction is the main scanning direction (predetermined direction). That is to say, the angle of the document 101 is θ1 of FIG. 5. Note, it is assumed that the angle θ1 takes a negative value in a case where the edge of the document 101 on the leading edge is tilted in such a manner that it is located upstream relative to the position (x1, y1) in the conveyance direction, and the angle θ1 takes a positive value in a case where the shadow created by the edge of the document 101 on the leading edge side is tilted in such a manner that it is located downstream relative to the position (x1, y1).

The CPU 203 outputs the front-surface document information, namely the position (x1, y1) and the angle θ1, to an image processing unit 208.

The image processing unit 208 reads out front-surface image data stored in the image memory 205 based on the position (x1, y1) and the angle θ1. Specifically, using the readout start position (x1, y1) as an origin point, the image processing unit 208 reads out image data along the direction parallel to the edge of the document 101 on the leading edge side.

After performing the readout from the position (x1, y1) by an amount corresponding to the width W along the direction parallel to the shadow, the image processing unit 208 performs the readout from the position (x2, y2) by the amount corresponding to the width W along the direction parallel to the shadow. Note that x2, y2 are expressed by, for example, the following formulae.

$$x2 = x1 - \tan θ1 \quad \text{formula (1)}$$

$$y2 = y1 + 1 \quad \text{formula (2)}$$

Note that although x2, y2 are decided on based on the aforementioned formulae (1), (2) in the first embodiment, no limitation is intended by this.

In the foregoing manner, the image processing unit 208 reads front-surface image data stored in the image memory up to the edge of the document on the trailing edge side.

FIG. 6 is a diagram showing the image that has been read out by the image processing unit 208. As shown in FIG. 6, as a result of reading out image data by the amount corresponding to the width W along the direction parallel to the edge on the leading edge side, the edge of the document on the leading edge side becomes parallel to the main scanning direction. Note that a similar process is performed with respect to back-surface image data. Hereinafter, these processes are referred to as a skew correction process.

When printing is to be performed by the image printing apparatus 301, the image processing unit 208 outputs image data to which the skew correction process has been applied to the system controller 151. The system controller 151 cuts out an image region to be printed from the image data output from the image processing unit 208. Specifically, for example, based on the position (0, 0) of the image data output from the image processing unit 208, which is shown in FIG. 6, the system controller 151 crops the image data in accordance with the size of the recording medium that has been set by the user with use of the operation unit 213. The system controller 151 controls the image printing apparatus 301 so that printing is performed based on the cropped image data. That is to say, the system controller 151 functions as an external device.

Furthermore, after the image processing unit 208 has implemented predetermined image processing, such as color determination, image file conversion, and document digitalization (e.g., OCR processing), the image processing unit 208 stores the image data after the image processing in the image memory 205. Image files and document files stored in the image memory 205 are transmitted via the network IF 211 to a cloud server 405 (FIG. 7) connected via, for example, the Internet and public lines. In this way, the cloud server 405 can perform document digitalization (e.g., OCR processing) with higher accuracy. Image document files to which document digitalization has thus been applied are stored in the image memory 205 again. Alternatively, they are stored to a file server 407 in the network 400, or transmitted to user terminals 404, 406 (FIG. 7) in the network. That is to say, external devices include not only the system controller 151 provided in the image forming apparatus 100, but also user terminals such as a smartphone, a tablet, and a PC, filer servers, and the like.

FIG. 7 is a diagram showing a configuration of the information processing system according to the first embodiment.

In this system, the cloud server 405 connected to a cloud network 401 is connected to the network 400. The file server 407, the image reading apparatus 200, and the user terminals 404, 406 are further connected to this network 400. Note that although only the image reading apparatus 200 is shown as an image reading apparatus in FIG. 7, a plurality of image reading apparatuses may be connected to the network 400.

Next, feed scanning in the first embodiment will be described with reference to the drawings.

Figure 8:
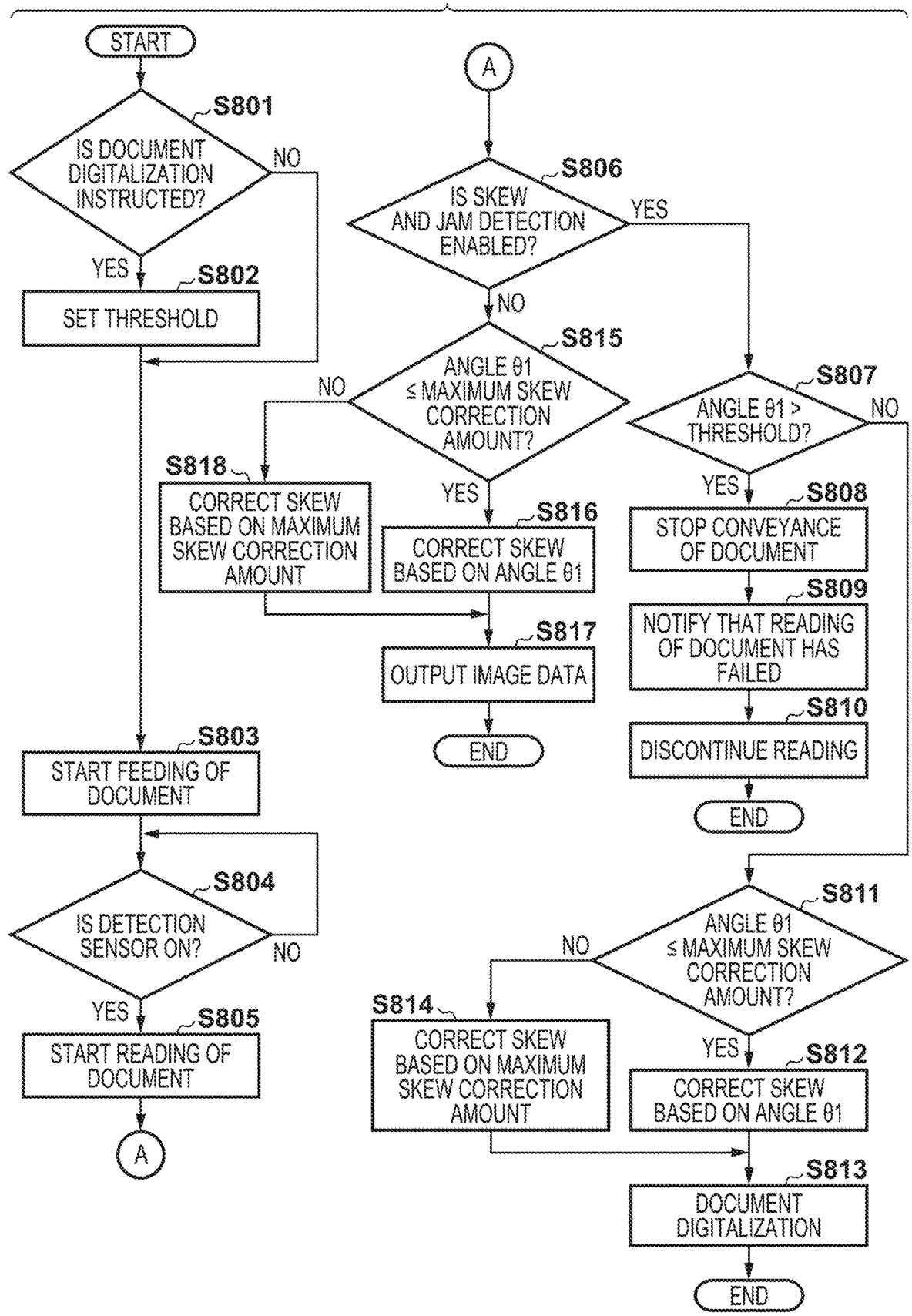
FIG. 8 is a flowchart for describing the flow of processing of feed scanning control in an automatic document reading apparatus according to the first embodiment.

FIG. 8 is a flowchart for describing the flow of processing of feed scanning according to the first embodiment. The processing indicated by this flowchart is started by the CPU 203 when an external device, such as a user terminal, or the operation unit 213 has input an instruction for starting the feed scanning to the CPU 203.

In step S801, when an instruction for executing document digitalization has been issued, processing proceeds to step S802, and the CPU 203 turns ON a flag indicating that the skew and jam detection is enabled, and sets a first threshold as a threshold. Note that in the first embodiment, a state where the angle θ1 has exceeded the threshold is referred to as skew and jam. The first threshold is decided on based on the maximum permissible skew range of document digitalization. The maximum permissible skew range is, for example, the maximum angle of skew angles that allow document digitalization to be executed with high accuracy. The maximum permissible range of document digitalization may be obtained from a command received from the external device or the operation unit 213, or may be stored in the nonvolatile memory 209 in advance. The first threshold is decided on using the following formula (3).

[First threshold]=[maximum permissible skew range of document digitalization]+[maximum skew correction amount]     (formula 3)

Note that the maximum skew correction amount is the maximum correctable angle in the skew correction process performed by the image processing unit 208. The maximum skew correction amount is set in accordance with, for example, the capacity of the image memory 205 and the like. In a case where the skew correction process is to be executed, the image processing unit 208 performs the skew correction process so that an image is rotated by the angle θ1 when the angle θ1 is equal to or smaller than the maximum skew correction amount, and performs the skew correction process so that an image is rotated by the maximum skew correction amount when the angle θ1 is larger than the maximum skew correction amount.

On the other hand, when the instruction for executing document digitalization has not been issued in step S801, processing proceeds to step S803. Note that when the instruction for executing document digitalization in the image processing unit 208 and the cloud server 405 has not been issued, the image processing unit 208 may or may not perform the skew correction process. In a case where the skew correction process is to be performed, the image processing unit 208 performs the skew correction process so that an image is rotated by the angle θ1 when the angle θ1 is equal to or smaller than the maximum skew correction amount. Also, in a case where the skew correction process is to be performed, the image processing unit 208 may perform the skew correction process so that an image is rotated by the maximum skew correction amount, or may not perform the skew correction process, when the angle θ1 is larger than the maximum skew correction amount.

Next, in step S803, the CPU 203 starts feeding a document.

Next, when the output of the detection sensor 113 has become ON in step S804, the CPU 203 starts reading the document based on the above-described method in step S805.

Next, when the skew and jam flag is ON, that is to say, the skew and jam detection is enabled in step S806, processing proceeds to step S807. When the angle θ1 is larger than the threshold in step S807, the CPU 203 stops the conveyance of the document in step S808. Then, in step S809, the user is notified of information indicating that the reading of the document has failed by displaying the information on the display unit of the operation unit 213. Note that the information indicating that the reading has failed includes information indicating that document digitalization cannot be performed appropriately because the angle θ1 is larger than the threshold. Thereafter, in step S810, the CPU 203 discontinues the reading of the document, and ends the present feed scanning control.

On the other hand, when the angle θ1 is equal to or smaller than the threshold in step S807, processing proceeds to step S811. When the angle θ1 is equal to or smaller than the maximum skew correction amount in step S811, the CPU 203 controls the image processing unit 208 so that the skew correction process is performed based on the angle θ1 in step S812. Thereafter, in step S813, the CPU 203 controls the image processing unit 208 so that document digitalization is executed with respect to image data to which the skew correction process has been applied. As a result, document digitalization is performed. Note that although document digitalization is executed by the image processing unit 208 in the first embodiment, no limitation is intended by this. For example, document digitalization may be executed by the cloud server 405. In this case, the CPU 203 controls the image processing unit 208 so that image data to which the skew correction process has been applied is output to the cloud server 405. Also, document digitalization may be executed by both of the image processing unit 208 and the cloud server 405.

On the other hand, when the angle θ1 is larger than the maximum skew correction amount in step S811, the CPU 203 controls the image processing unit 208 so that the skew correction process is performed based on the maximum skew correction amount in step S814, and processing proceeds to step S813.

On the other hand, when the skew and jam flag is OFF in step S806, processing proceeds to step S815. When the angle θ1 is equal to or smaller than the maximum skew correction amount in step S815, the CPU 203 controls the image processing unit 208 so that the skew correction process is performed based on the angle θ1 in step S816. Thereafter, processing proceeds to step S817, and the CPU 203 controls the image processing unit 208 so as to output image data to which the skew correction process has been applied. Specifically, for example, in a case where printing is to be executed, the image data is output to the image printing apparatus 301.

On the other hand, when the angle θ1 is larger than the maximum skew correction amount in step S815, processing proceeds to step S818, the CPU 203 controls the image processing unit 208 so that the skew correction process is performed based on the maximum skew correction amount, and processing proceeds to step S817.

Figure 9:
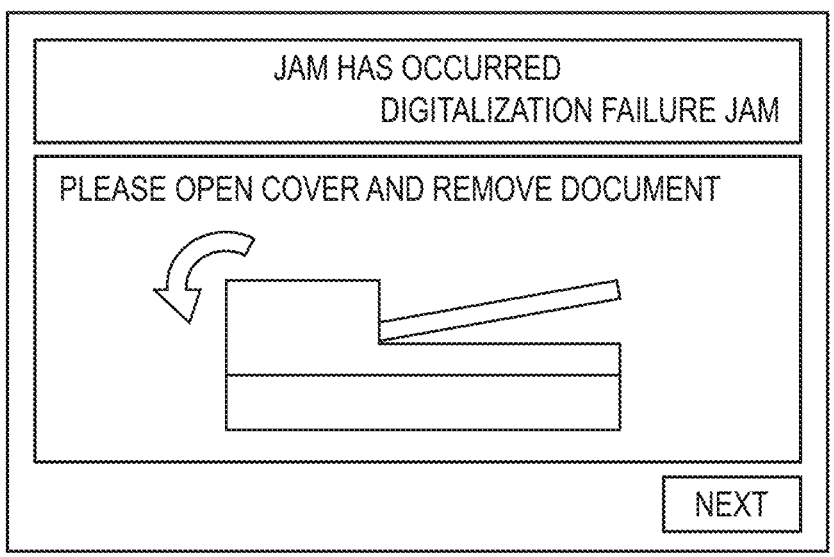
FIG. 9 is a diagram showing one example of a UI screen that is displayed on an operation unit when a jam has occurred in the document reading apparatus according to the first embodiment.

FIG. 9 is a diagram showing one example of a UI screen that is displayed on the operation unit 213 when a jam has occurred in the image reading apparatus 200 according to the first embodiment. Furthermore, FIGS. 10A, 10B are diagrams showing examples of a UI screen that is displayed after jam processing on the image reading apparatus 200.

Note that when the user is notified of the failure in the reading of the document in step S809 of FIG. 8, the CPU 203 displays, for example, the jam notification screen shown in FIG. 9 on the operation unit 213. The screen of FIG. 9 displays, for example, the occurrence of a jam (skew and jam), as well as a message and an illustration representing an instruction for opening a cover and removing a jammed document in order to recover from this jammed state. Once the CPU 203 has confirmed that every document remaining inside the document feeding unit 201 has been removed, it confirms the setting of restart processing following the jam detection. Note that whether every document remaining inside the document feeding unit 201 has been removed is confirmed based on a non-illustrated sheet sensor provided on the conveyance path in the document feeding unit 201. The setting of the restart processing is stored in, for example, the nonvolatile memory 209. This setting includes an intermediate return mode for restarting the reading from the jammed document, or an entire return mode for re-reading all documents from the start of a bundle of documents; it is possible to set which mode is to be selected via the operation unit 213 in advance.

Figure 10A:
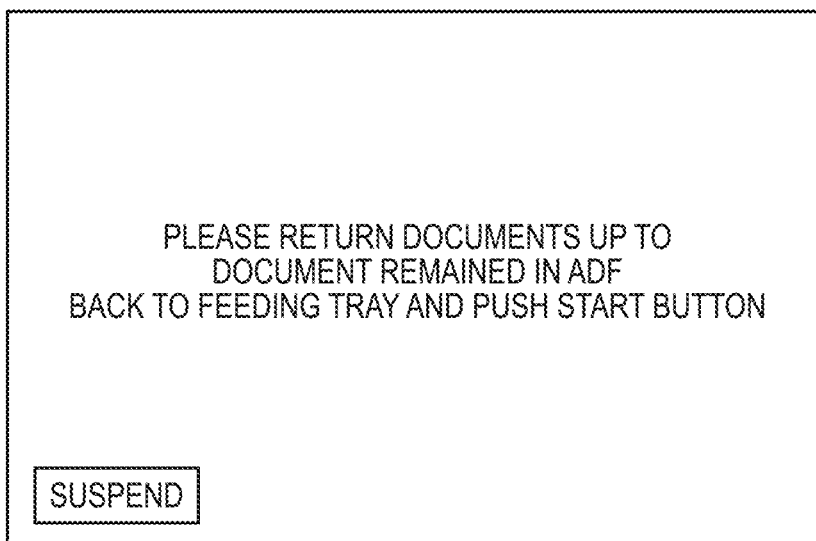
FIGS. 10A and 10B are diagrams showing examples of an UI screen that is displayed after jam processing on the document reading apparatus.
Figure 10B:
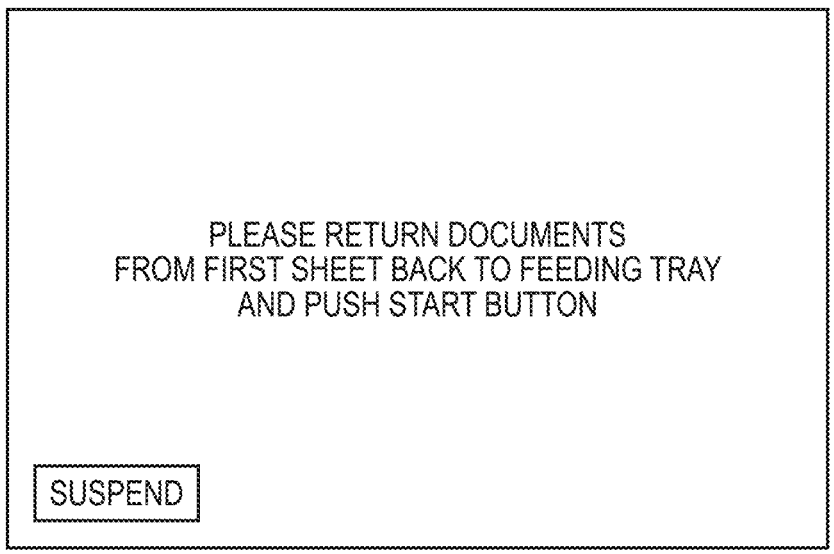

When the setting of the jam restart processing is the intermediate return mode, the CPU 203 displays, for example, an intermediate return screen shown in FIG. 10A on the display unit of the operation unit 213. On the other hand, when the setting of the restart processing is the entire return mode, the CPU 203 discards image data up to that point that has been stored in the image memory 205. Then, the CPU 203 displays, for example, an entire return screen shown in FIG. 10B on the display unit of the operation unit 213. Once an instruction for starting re-reading of the document has been input, the CPU 203 starts reading the document.

As described above, according to the first embodiment, in a case where the skew amount of a document has exceeded the permissible range of document digitalization at the time of document digitalization, the reading of the document is immediately stopped, and the user is notified of the failure in the reading. In this way, whether the reading of the document has succeeded or failed can be determined before reading all documents. As a result, whether the reading of the document has succeeded or failed can be confirmed in a short period of time compared to a case where the user confirms whether the reading of documents has failed after reading all documents. That is to say, a decrease in the usability of the image reading apparatus can be suppressed. Furthermore, when the intermediate return setting has been configured, the reading can be restarted from the document that has failed in the reading, which brings about an additional advantageous effect whereby a time period required for the user to re-read the document can be shortened. That is to say, a decrease in the usability of the image reading apparatus can be suppressed.

Second Embodiment

The following describes, as a second embodiment of the present disclosure, control for a case where the skew amount is detected using simpler skew detection sensors without performing a skew detection and correction process of the image processing unit 208. Note that a configuration of a printing system, a hardware configuration of a document reading apparatus, and the like according to the second embodiment are similar to those of the above-described first embodiment, and thus a description thereof is omitted.

First, skew detection control that uses skew detection sensors according to the second embodiment will be described.

Figure 11A:
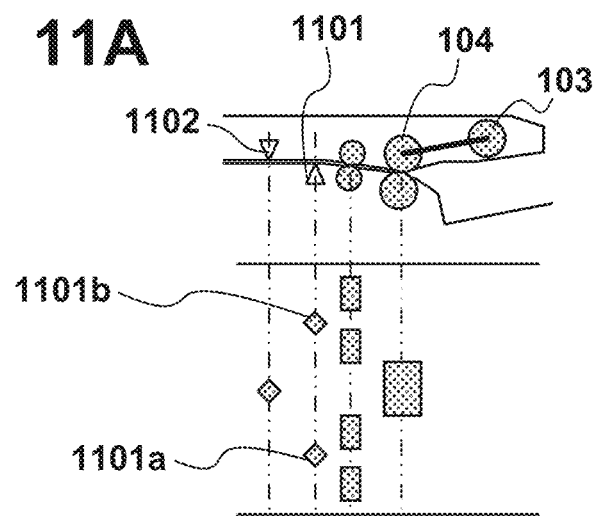
FIGS. 11A to 11C are explanatory diagrams showing a positional relationship between a skewed document that is currently conveyed and skew detection sensors in the document reading apparatus according to a second embodiment.
Figure 11B:
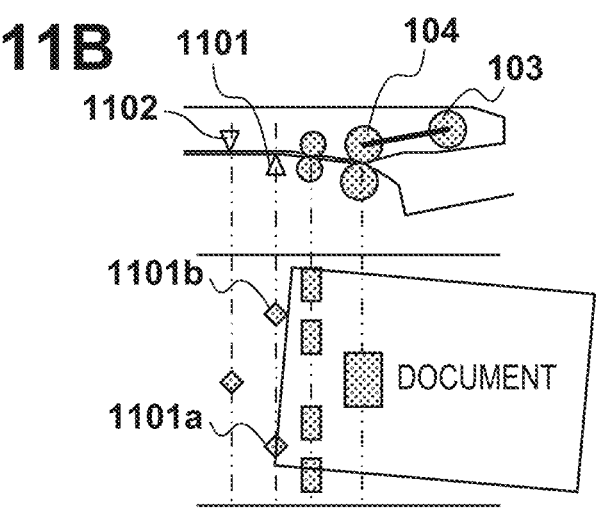
Figure 11C:
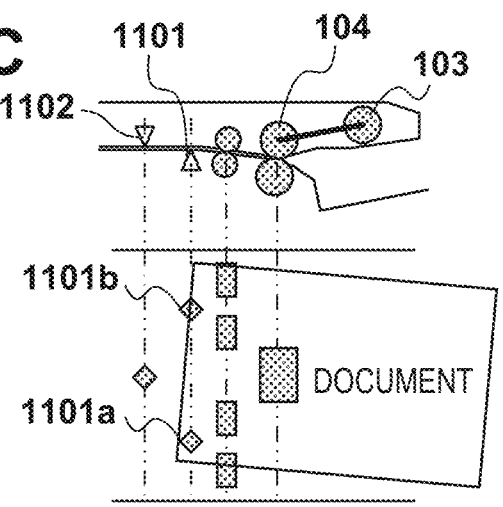

FIGS. 11A to 11C are explanatory diagrams showing a positional relationship between a skewed document that is currently conveyed and skew detection sensors 1101 in the image reading apparatus 200 according to the second embodiment. The upper parts of FIGS. 11A to 11C are cross-sectional views of the periphery of the skew detection sensors 1101, and the lower parts thereof are plan views in which the conveyance path around the skew detection sensors 1101 is laid out on a plane. The dash and double-dot lines connecting between the cross-sectional view and the plan view indicate correspondence between the positions of sensors and rollers in each diagram. Note that in FIGS. 11A to 11C, the document moves from right to left.

The skew detection sensors 1101 include two sensors 1101a, 1101b. Each of the skew detection sensors 1101a, 1101b is a sensor for detecting the leading edge of the document, and is composed of, for example, an optical sensor and the like. As shown in FIG. 11A, the skew detection sensors 1101a, 1101b are placed in such a manner that two of them are aligned with each other along the direction perpendicular to the conveyance direction, with an interval therebetween. Therefore, when the document is not skewed, the skew detection sensors 1101a, 1101b detect the leading edge of the document substantially simultaneously.

On the other hand, when the document is skewed, there is a temporal gap between the first detection of the leading edge of the document by one sensor, and the subsequent detection of the leading edge of the document by the other sensor. For example, as shown in FIG. 11B, the skew detection sensor 1101a detects the leading edge of the document. Then, as the feeding and conveyance of the document further progress, the skew detection sensor 1101b detects the leading edge of the document as shown in FIG. 11C. In this case, the approximate skew amount of the document can be calculated based on an elapsed time period from the detection of the leading edge of the document by one sensor to the detection of the leading edge of the document by the other sensor.

Now, assume that the conveyance speed of the document is V [mm/s], the interval between the skew detection sensor 1101a and the skew detection sensor 1101b in the width direction is W [mm], and the elapsed time period from the detection of the leading edge of the document by one sensor to the detection of the leading edge of the document by the other sensor is t [s]. In this case, provided that the skew amount of this document is θo, the following formula (4) holds.

$$t = W \times \tan \theta o \div V \qquad \text{formula (4)}$$

In the second embodiment, in a case where the document is skewed by the threshold θ or more, feeding and conveyance processing of the document is suspended, and driving of motors in a conveyance system is stopped. That is to say, a time period tθ corresponding to the threshold θ is obtained from the following formula (5).

$$t\theta = W \times \tan \theta \div V \qquad \text{formula (5)}$$

In a case where the other detection sensor has not detected the leading edge of the document before the time period tθ elapses since the detection of the leading edge of the document by one skew detection sensor, it is determined that the document is skewed by an amount that exceeds the threshold θ, and the feeding and conveyance processing of the document is suspended.

Note that the larger the interval between the skew detection sensors, the larger the temporal difference t between the detections performed by the sensors with respect to the skew amount θo. Therefore, in order to set the largest possible interval between the two skew detection sensors 1101a, 1101b, it is desirable to place them at the positions close to the edges of the document in the width direction. However, in the second embodiment, in order to enable the skew detection sensors 1101a, 1101b to detect the leading edge of the document even when the document has the smallest size that can be conveyed in the image reading apparatus 200, the skew detection sensors 1101a, 1101b are placed so that they are close to the edges of the document in the width direction when the document being fed and conveyed has the smallest size.

The following describes feed scanning control for a case where the skew amount of the document is detected using the skew detection sensors according to the second embodiment.

Figure 12:
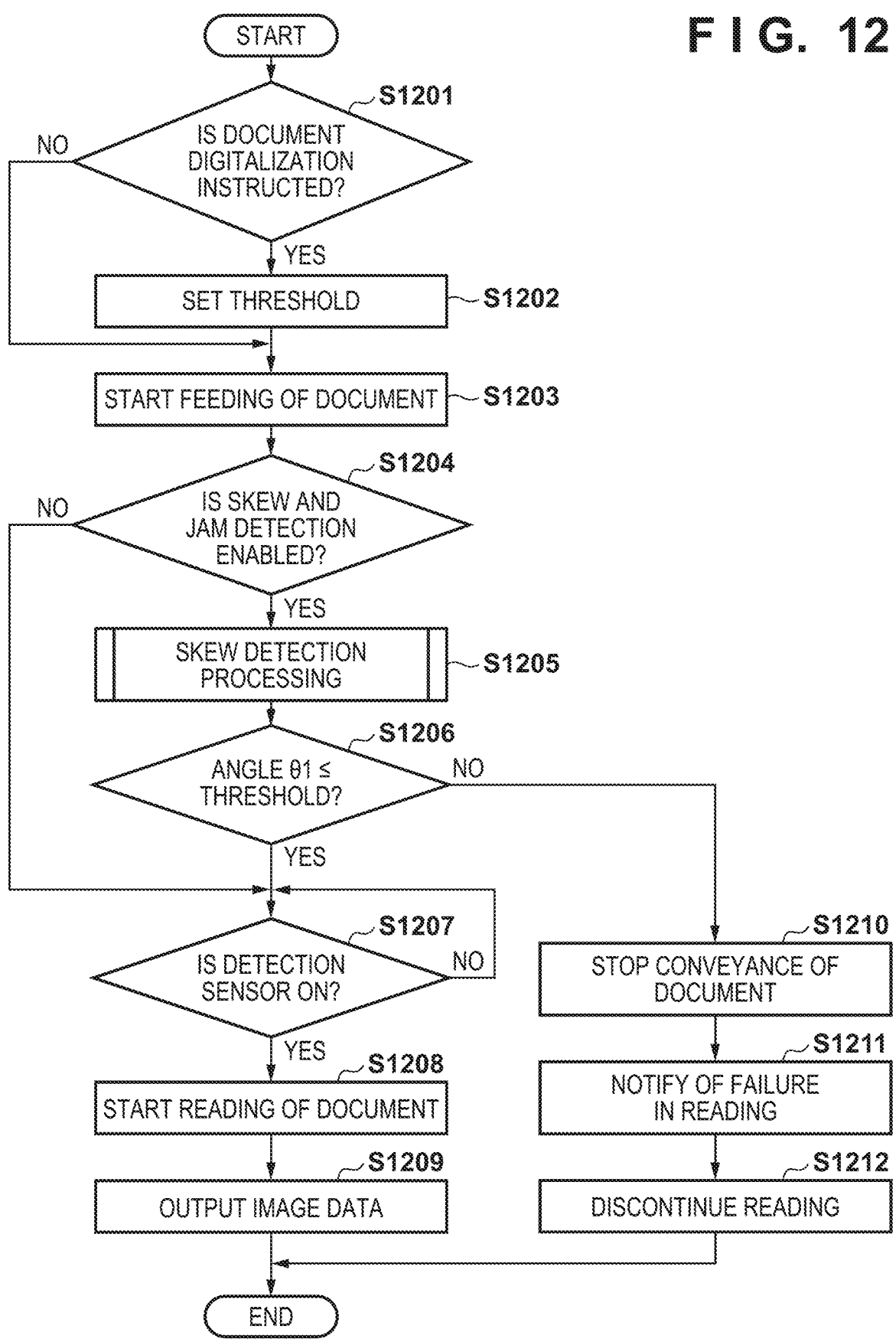
FIG. 12 is a flowchart for describing feed scanning control in the document reading apparatus according to the second embodiment.

FIG. 12 is a flowchart for describing the feed scanning control in the image reading apparatus 200 according to the second embodiment. Processing indicated by this flowchart is achieved by the CPU 203 executing a program.

Figure 13A:
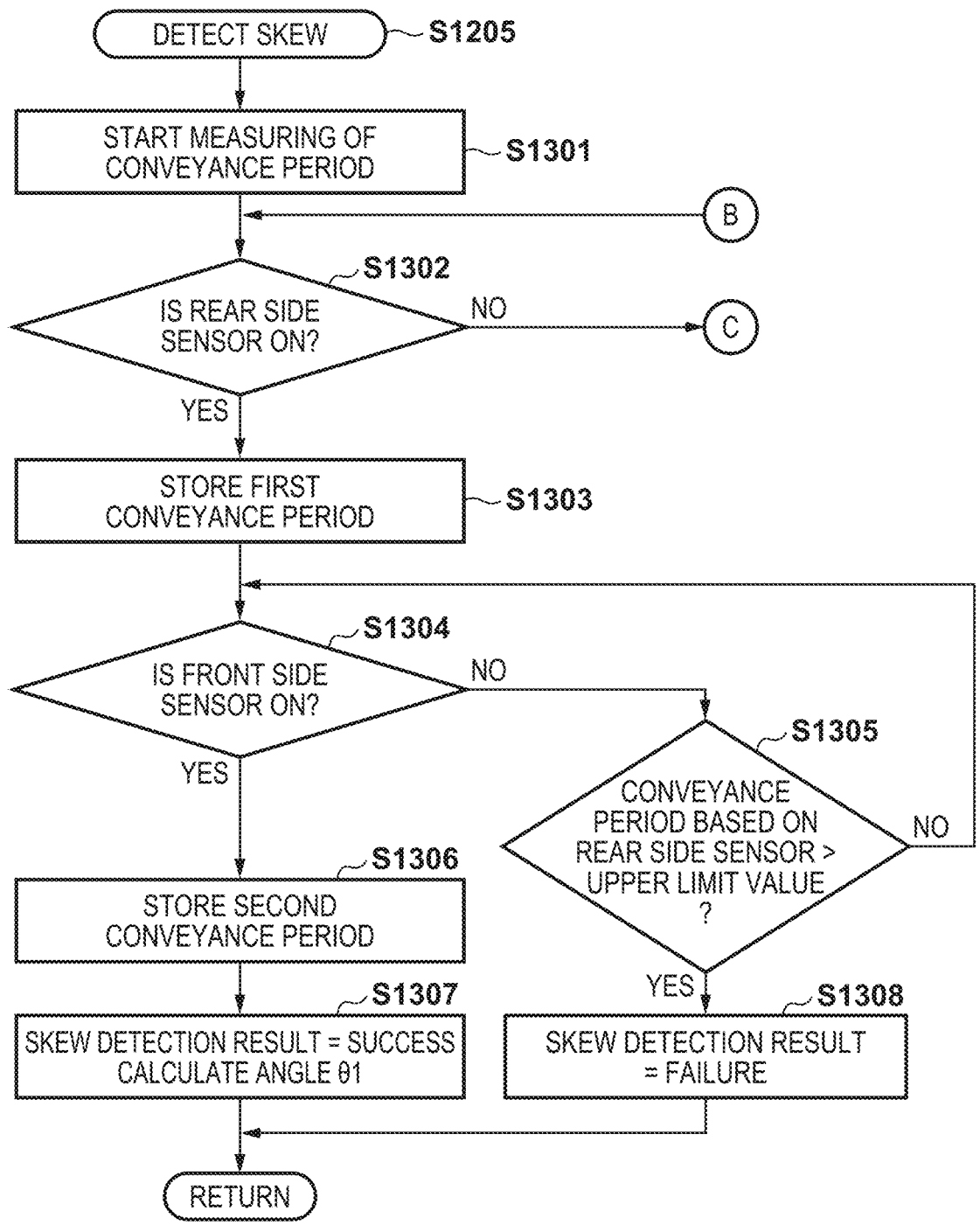
FIGS. 13A and 13B are flowcharts for describing the flow of document skew detection processing in step S1505 of FIG. 15.
Figure 13B:
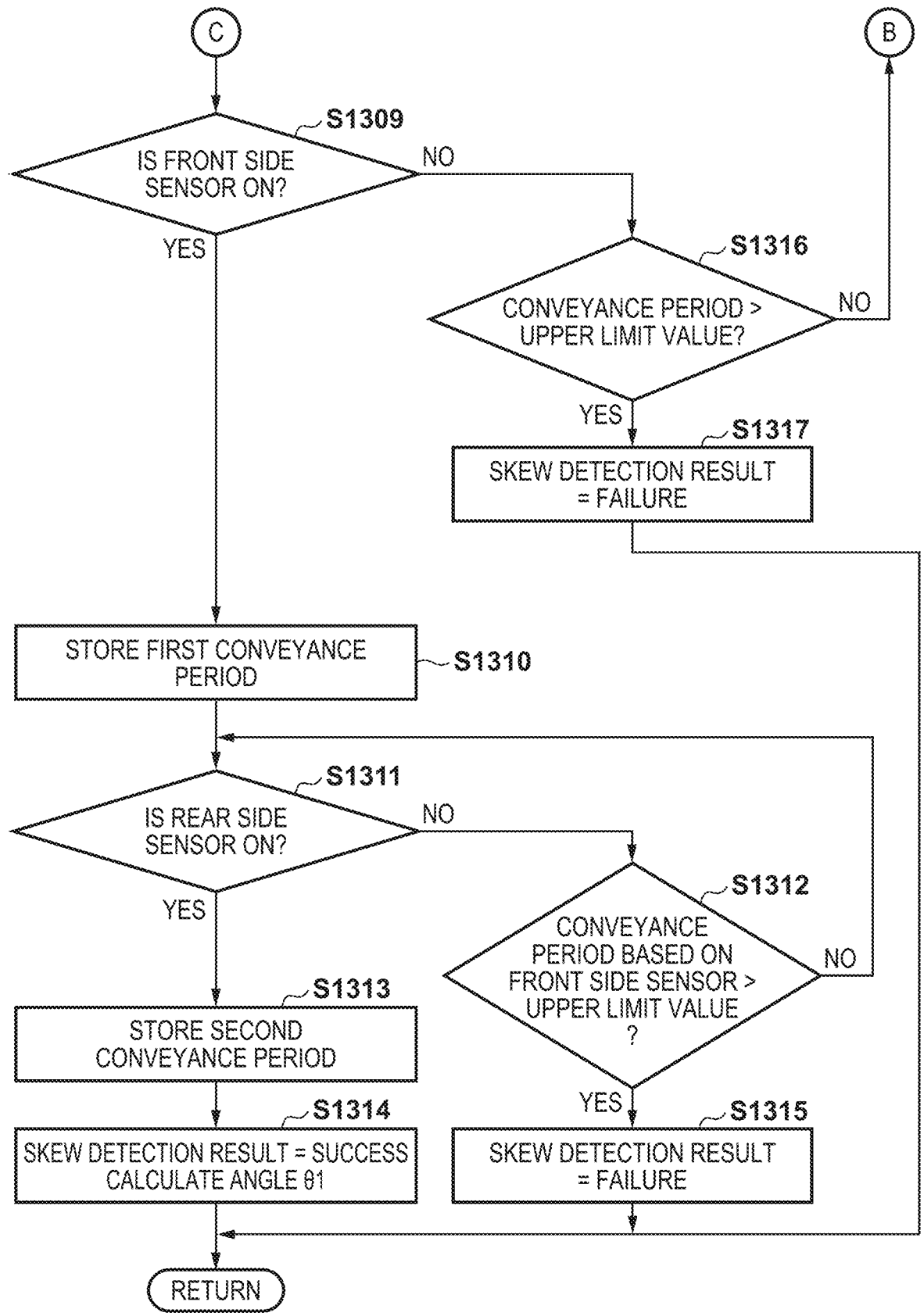

FIGS. 13A and 13B are flowcharts for describing the flow of document skew detection processing in step S1205 of FIG. 12.

The processing indicated by the flowchart of FIG. 12 is started when the CPU 203 has received a feed scanning start command. First, in step S1201, the CPU 203 determines whether document digitalization is to be performed. When document digitalization is to be performed, the skew and jam detection is enabled and a first threshold is stored as a skew and jam threshold in step S1202. Here, while the first threshold is decided on based on the maximum permissible skew range of document digitalization as described earlier, the skew correction process is not performed in the second embodiment. Therefore, the maximum permissible skew range of document digitalization is used as the first threshold. Accordingly, it is determined that skew and jam have occurred when the skew amount has exceeded the maximum permissible skew range of document digitalization. Furthermore, when document digitalization is not to be performed, the skew and jam detection may be disabled. Alternatively, even when document digitalization is not to be performed, if the image skew is desired to be suppressed, it is permissible to enable the skew and jam detection, store a second threshold that is different from the first threshold as the threshold, and perform the skew and jam detection. In this case, the maximum skew amount that allows a document to be conveyed on the conveyance path may be used as the second threshold.

Upon completion of processing for setting the skew and jam threshold in step S1202 in the foregoing manner, processing proceeds to step S1203, and the CPU 203 sets a reading resolution and a color mode on the image reading apparatus 200 and performs reading preparation processing, such as shading processing. Then, the CPU 203 starts feeding, as well as driving of the conveyance motor 212, thereby starting feeding of a document. At this time, a separation motor is driven so as to lower the pickup rollers to the surface of the document and rotate the pair of separation rollers, thereby feeding the document. Next, processing proceeds to step S1204, and the CPU 203 determines whether the skew and jam detection is enabled; when it is determined that the skew and jam detection is enabled, processing proceeds to step S1205, and the CPU 203 performs the skew detection processing indicated by the flowchart of FIGS. 13A and 13B. On the other hand, when it is determined that the skew and jam detection is not enabled, processing proceeds to step S1207.

In the skew detection processing shown in FIGS. 13A and 13B, the CPU 203 starts measuring a conveyance period from the start of skew detection, which is used as a reference for skew detection, in step S1301. Then, processing proceeds to step S1302, and the CPU 203 confirms the output from the rear side sensor 1101b. When the output from the rear side sensor 1101b has become ON, it means that the output from the rear side sensor 1101b indicates that the leading edge of the document has been detected. Thus, processing proceeds to step S1303, and the CPU 203 stores a conveyance time period from when the skew detection was started to when the output from the rear side sensor 1101b became ON as a first conveyance time period to the nonvolatile memory 209. Next, processing proceeds to step S1304, and the CPU 203 determines whether the output from the front side sensor 1101a became ON. When the output from the front side sensor 1101a is OFF, processing proceeds to step S1305, and the CPU 203 determines whether a conveyance time period from the detection of the leading edge of the document by the rear side sensor 1101b, which is obtained based on the conveyance time period from the start of skew detection and the first time conveyance period, has exceeded an upper limit conveyance time period. When it is determined that the upper limit conveyance time period has not been exceeded, processing proceeds to step S1304, and the CPU 203 determines whether the output from the front side sensor 1101a became ON again.

When the output from the front side sensor 1101a became ON in step S1304 before the conveyance time period from the detection of the leading edge of the document by the rear side sensor 1101b exceeds the upper limit conveyance time period in step S1305, processing proceeds to step S1306. In step S1306, the CPU 203 stores a time period that has thus elapsed as a second conveyance time period to the nonvolatile memory 209. Then, it is determined that the skew detection has succeeded, processing proceeds to step S1307, the CPU 203 calculates the skew amount (angle θ1) based on the time period from when the output from the rear side sensor 1101b became ON to when the output from the front side sensor 1101a became ON (the second conveyance time period), and the present skew detection processing is ended.

On the other hand, when the conveyance time period from the detection of the leading edge of the document by the rear side sensor 1101b has exceeded the upper limit conveyance time period before the output from the front side sensor 1101a became ON, processing proceeds from step S1305 to step S1308. In step S1308, the CPU 203 determines that a skew exceeding the skew amount that can be detected by the skew detection processing has occurred. Then, the skew detection is deemed to have failed, and the present skew detection processing is ended.

On the other hand, when the output from the rear side sensor 1101b is OFF in step S1302 after the start of skew detection, processing proceeds to step S1309, and the CPU 203 confirms the output from the front side sensor 1101a. The flow of processing from step S1310 to step S1315 is substantially similar to step S1303 to step S1308 described above, and the relationship between the rear side sensor 1101b and the front side sensor 1101a is merely reversed therein; thus, a description thereof is omitted.

Furthermore, when the outputs from the rear side sensor 1101b and the front side sensor 1101a are both OFF in step S1309 after the start of skew detection, processing proceeds to step S1316, and the CPU 203 determines whether the conveyance time period from the start of skewed conveyance has exceeded an upper limit value. Here, when the upper limit value has not been exceeded, processing proceeds to step S1302; otherwise, processing proceeds to step S1317. In step S1317, the CPU 203 determines that the skew amount θo is unknown and the skew detection has failed, and ends the present skew detection. The upper limit value of the conveyance time period mentioned here is obtained by adding a margin to the longer one of the conveyance time period from the start of conveyance to the arrival of the leading edge of the document at the rear side sensor 1101b and the conveyance time period from the start of conveyance to the arrival of the leading edge of the document at the front side sensor 1101a. Therefore, when neither the rear side sensor 1101b nor the front side sensor 1101a was able to detect the leading edge of the document even though the document was conveyed for the time period corresponding to this upper limit value, it is considered that the document has lodged (jammed) in a position that is upstream relative to the positions of the rear side sensor 1101b and the front side sensor 1101a in the conveyance direction, and the skew amount cannot be calculated based on the skew detection in the current status. Accordingly, the skew amount θo is judged to be unknown.

Returning to FIG. 12 again, upon completion of the skew detection processing of step S1205, which was described using FIGS. 13A and 13B, processing proceeds to step S1206. In step S1206, when the CPU 203 determines that the result of skew detection in step S1205 indicates that the skew detection has failed or the skew amount (angle θ1) has exceeded the threshold, processing proceeds to step S1210. In step S1210, the CPU 203 determines that the document has skewed significantly or jammed, and stops the conveyance of the document. Then, processing proceeds to step S1211, and the CPU 203 gives notification of the failure in reading. Next, processing proceeds to step S1212, the CPU 203 performs processing for discontinuing reading processing by, for example, stopping the driving of the document reading unit, and the present feed scanning control is ended.

On the other hand, when it is determined that the control of the skew and jam detection is not to be performed in step S1204, or when a significant skew of the document or a jam of the document has not been detected in step S1206, processing proceeds to step S1207, and the CPU 203 determines whether the detection sensor 113 has become ON; when the detection sensor 113 has become ON, processing proceeds to step S1208, and reading of the document is started. Here, image data obtained by reading the document is stored in the image memory 205. Then, processing proceeds to step S1209, the CPU 203 outputs the image data of the document stored in the image memory 205, and the present processing is ended.

As described above, according to the second embodiment, similarly to the first embodiment, in a case where the skew amount has exceeded the permissible range of document digitalization at the time of document digitalization, the reading of the document is immediately stopped, and the user is notified of the failure in the reading. In this way, whether the reading of the document has succeeded or failed can be determined before reading all documents. As a result, the failed document can be confirmed with a short lead time compared to a case where the user confirms the failed document after reading all documents. Furthermore, as reading processing can be restarted from the document that failed in reading, a lead time of re-reading can be reduced for the user.

Third Embodiment

The following describes, as a third embodiment of the present disclosure, an embodiment for a case where, when the skew amount (angle θ1) exceeds the threshold while a skew is being detected, notification of skew and jam is not given immediately, and notification of skew and jam is given after the discharge of a document is completed. Although the following description is given using an exemplary case where the skew amount of the document is detected from read image data as described in the first embodiment, the third embodiment is not limited to this, and is also applicable to a case where the skew amount is detected using the skew detection sensors 1101 described in the second embodiment. Note that a configuration of a printing system, a hardware configuration of the image reading apparatus 200 and the like according to the third embodiment are similar to those of the above-described first embodiment, and thus a description thereof is omitted.

Figure 14:
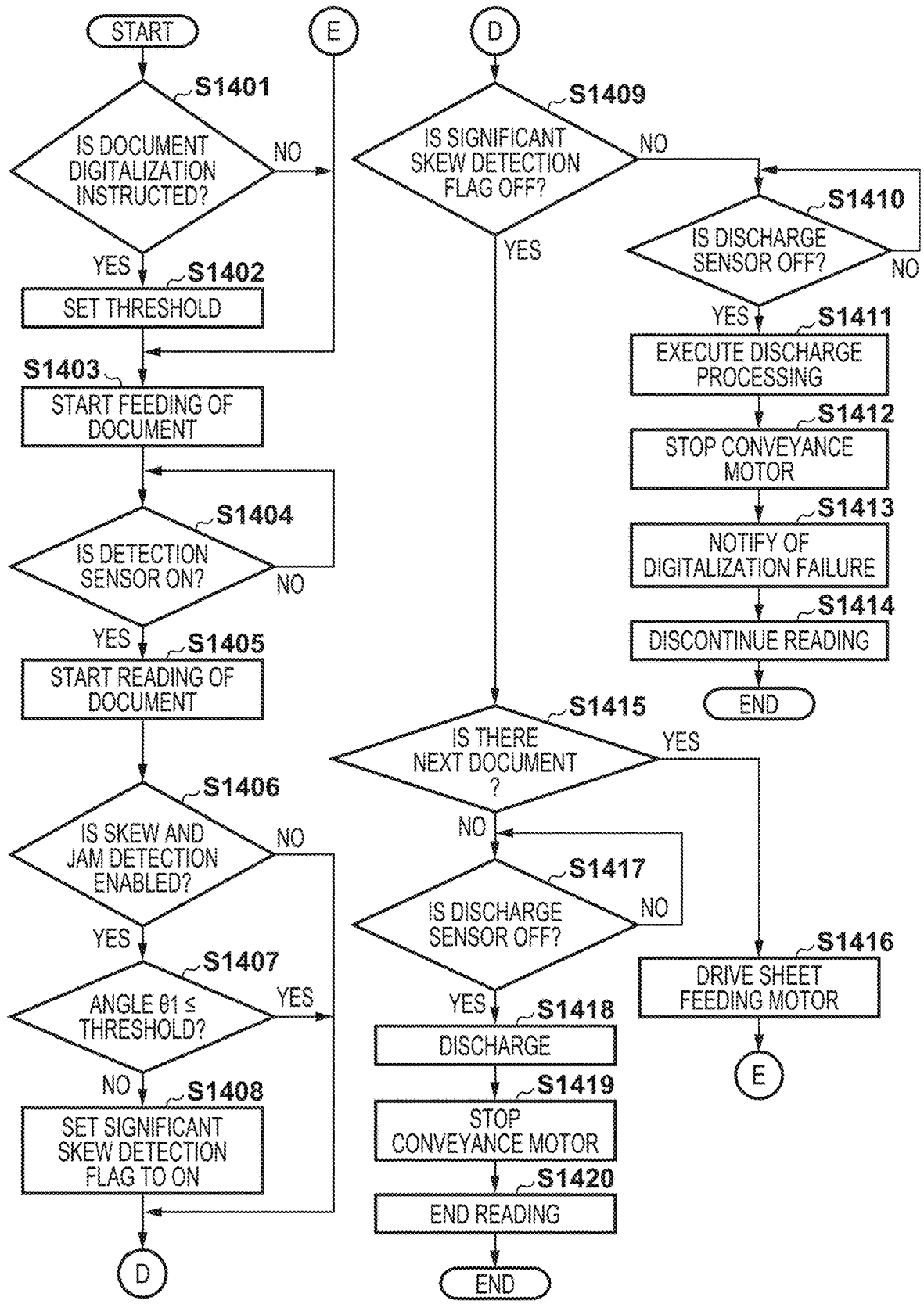
FIG. 14 is a flowchart for describing feed scanning control in the document reading apparatus according to a third embodiment.

FIG. 14 is a flowchart for describing feed scanning control in the image reading apparatus 200 according to the third embodiment. Processing indicated by this flowchart is achieved by the CPU 203 executing a program. Note that the flow from step S1401 to step S1406 of FIG. 14 is similar to the flow from step S801 to step S806 of FIG. 8, which was described in the first embodiment, and thus a description thereof is omitted.

When the skew and jam detection is enabled in step S1406, the CPU 203 proceeds to step S1407 and performs skew and jam detection processing. In this skew and jam detection processing, the CPU 203 confirms the result of skew detection; when the skew detection has succeeded and the angle θ1 is equal to or smaller than the threshold, it is determined that the document has not skewed significantly or the document has not jammed, the skew and jam detection processing is ended, and processing proceeds to step S1409. On the other hand, when the skew and jam detection has failed or the angle θ1 has exceeded the threshold in step S1407, the CPU 203 determines that the document has skewed significantly or jammed, and proceeds to step S1408. In step S1408, the CPU 203 sets a significant skew detection flag in the nonvolatile memory 209 to ON, ends the present skew and jam detection processing, and proceeds to step S1409.

In step S1409, the CPU 203 confirms the aforementioned significant skew detection flag stored in the nonvolatile memory 209. When the significant skew detection flag is ON, the CPU 203 determines that the skew and jam have occurred, proceeds to step S1410, and executes skew and jam processing. On the other hand, when the significant skew detection flag is OFF, processing proceeds to step S1415, and whether there is a next document is checked.

In step S1410, the CPU 203 confirms the output from a discharge sensor, and waits until the output from the discharge sensor becomes OFF, namely, waits until a sheet has been discharged if the sheet remains around the discharge rollers 319 and 324. When the output from the discharge sensor has become OFF, processing proceeds to step S1411, and the CPU 203 executes discharge processing and reliably discharges the document to a discharge tray by causing the conveyance motor 212 to rotate by a predetermined amount. Once the discharge processing has been completed in the foregoing manner, processing proceeds to step S1412, and the CPU 203 stops the driving of the conveyance motor 212. Then, processing proceeds to step S1413, and the CPU 203 notifies the CPU 151a of the system controller 151 of the failure in reading of the document. Thereafter, processing proceeds to step S1414, the CPU 203 performs processing for discontinuing reading by, for example, stopping the driving of the image reading apparatus 200, and the feed scanning control is ended.

On the other hand, when the significant skew detection flag is OFF in step S1409, processing proceeds to step S1415 without performing the skew and jam processing, and the CPU 203 confirms the output from a document presence/absence sensor; when there is a next document, processing proceeds to step S1416, feeding of the next document is started by driving the separation motor again, and processing proceeds to step S1403. On the other hand, when it is determined that there is no next document in step S1415, processing proceeds to step S1417, and the CPU 203 performs document discharge processing in step S1418 and stops the driving of the conveyance motor 212 in step S1419 after waiting for the output from the discharge sensor to become OFF in step S1417. Then, processing proceeds to step S1420, and document reading processing is ended.

FIG. 15 is a flowchart for describing the feed scanning control performed by the system controller 151 of the image reading apparatus 200 according to the third embodiment. Note that processing indicated by this flowchart is achieved by the CPU 151a executing a program that has been deployed to the RAM 151c.

Figure 16A:
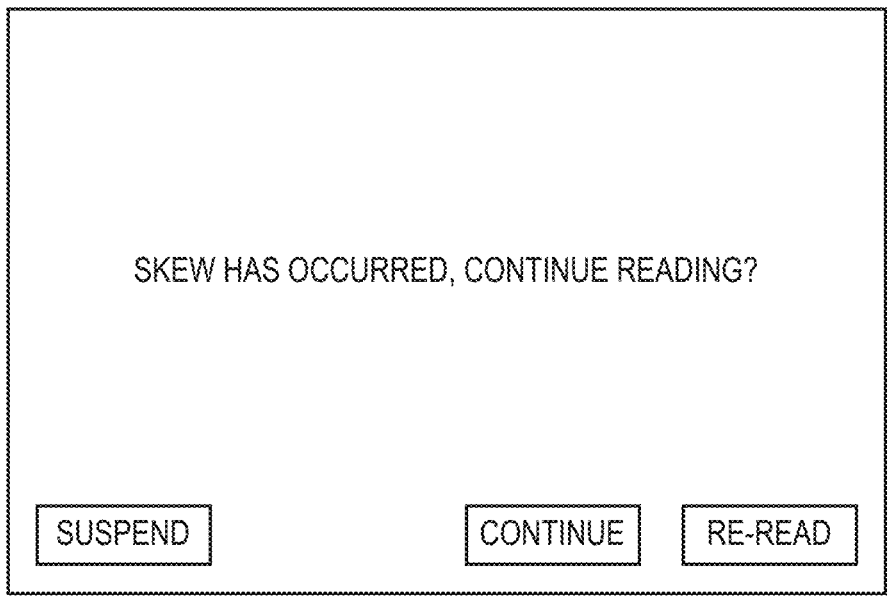
FIG. 16A is a diagram showing an exemplary UI screen that is displayed when a jam has occurred in the third embodiment.
Figure 16B:
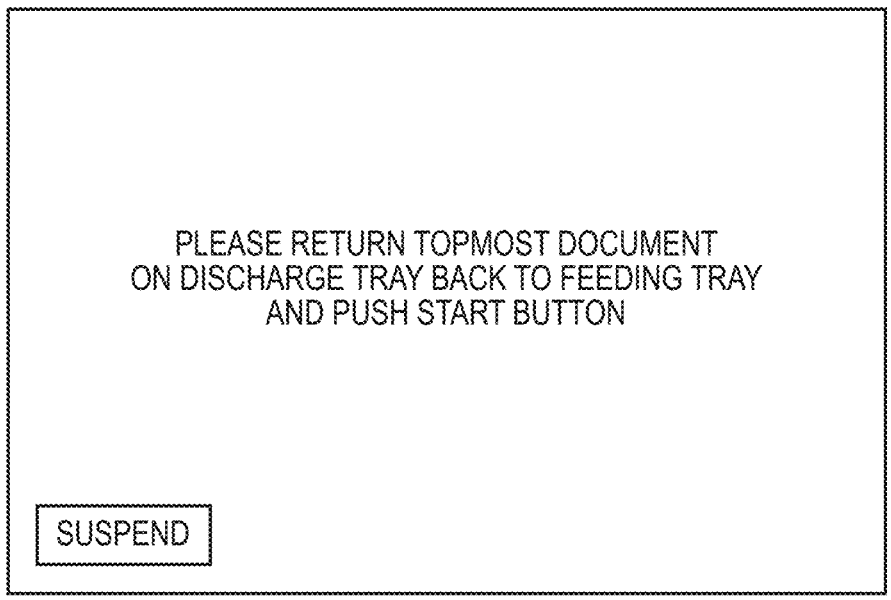
FIG. 16B is a diagram showing an exemplary UI screen that is displayed after jam processing.

FIG. 16A is a diagram showing a UI screen that is displayed when a jam has occurred, and FIG. 16B is a diagram showing a UI screen that is displayed after the jam processing.

In step S1501, the CPU 151a instructs the controller 2000 to start reading a document. Then, processing proceeds to step S1502, and the completion of reading of the document from the controller 2000 is waited for. Upon receiving the completion of reading, processing proceeds to step S1503, and the CPU 151a determines whether the reading has succeeded; when the reading has succeeded, processing proceeds to step S1511, an obtained image data is converted into an image file, and the present processing is ended.

On the other hand, when it is determined that the reading of the document has failed in step S1503, the CPU 151a proceeds to step S1504 and displays, on the operation unit 213, a screen for confirming whether to continue the reading of the document as shown in FIG. 16A, for example. This screen displays a message which indicates the occurrence of the skew of the document and which makes an inquiry about whether to continue the reading of the document. Here, when "continue" has been selected, processing proceeds from step S1505 to step S1510. In step S1510, the CPU 151a instructs the controller 2000 to restart the reading of the document, proceeds to step S1502, and again waits for the CPU 203 to give notification of the completion of, or failure in, the reading.

On the other hand, when "re-read" has been selected on the screen on FIG. 16A, processing proceeds to step S1506. In step S1506, the CPU 151a confirms the setting of jam restart processing. Here, when the CPU 151a determines that the setting of the jam restart processing is the intermediate return mode, processing proceeds to step S1507. In step S1507, the CPU 151a displays, for example, the intermediate return screen shown in FIG. 16B on the operation unit 213. FIG. 16B shows a view illustrating a display of a message representing an instruction for returning the topmost document on a discharge tray back to the feeding tray 102 and depressing a start button. Once the user has depressed the start button after performing such operations, processing proceeds from step S1507 to step S1510, the controller 2000 is instructed to restart the reading of the document, and processing proceeds to step S1502.

On the other hand, when the CPU 151a determines that the setting of the jam restart processing is the entire return mode in step S1506, the CPU 151a proceeds to step S1508 and discards image data which has already been read up to that point and which has been stored in the image memory 205. Then, processing proceeds to step S1509, and the CPU 151a displays the entire return screen shown in FIG. 10B. FIG. 10B shows display of a message representing an instruction for returning the documents, from the first sheet, to the feeding tray 102 and depressing the start button. Once the user has depressed the start button after performing such operations, processing proceeds from step S1509 to step S1510, the controller 2000 is instructed to restart the reading of the documents, and processing proceeds to step S1502.

According to the third embodiment, in a case where a significant skew or a jam of one document has been detected after reading this document, this document is discharged, and then notification of a document reading error is given. In this way, the failure in reading of the document can be determined before all documents are read; thus, the failed document can be confirmed with a short lead time compared to a case where the user confirms the failed document after reading all documents. Furthermore, when the intermediate return setting has been configured, reading can be restarted from the document that has failed in reading, and thus a lead time of re-reading can be reduced for the user. Moreover, when the document has jammed, there is no need for the user to perform a task of removing the document to address this jam, and thus a lead time can be further reduced for the user.

Other Embodiments

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-95698, filed Jun. 1, 2020, which is hereby incorporated by reference herein in its entirety.

What is claimed is:

1. An image reading apparatus comprising:
a stacking unit on which a document is to be stacked;
a feeding unit configured to feed the document stacked on the stacking unit;
a conveyance unit configured to convey the document fed by the feeding unit;
a reading unit configured to read the document being conveyed by the conveyance unit, and to generate image data indicating an image of the document;
a notification unit configured to notify a user of information; and
one or more controllers being configured to:
determine, based on the image data, a tilt amount of an edge of the document on a leading edge side in a conveyance direction in which the document is conveyed, wherein the tilt amount corresponds to an angle of tilt to a predetermined direction perpendicular to the conveyance direction,
control, in a case where the determined tilt amount is larger than a first threshold in a case of a setting that performs optical character recognition (OCR) processing with respect to the image data, the notification unit so as to give notification of information indicating that reading of the document for the OCR processing has failed, and
execute, in a case where the determined tilt amount is not larger than the first threshold in the case of the setting that performs the OCR processing, the OCR processing with respect to the image data.

2. The image reading apparatus according to claim 1, wherein the one or more controllers are configured to stop, in the case of the setting that performs the OCR processing, feeding of the document stacked on the stacking unit in the case where the determined tilt amount is larger than the first threshold.

3. The image reading apparatus according to claim 2, wherein the one or more controllers are configured to stop, in the case of the setting that performs the OCR processing, conveyance of the document being conveyed by the conveyance unit in the case where the determined tilt amount is larger than the first threshold.

4. The image reading apparatus according to claim 2, wherein the one or more controllers are configured to discharge, in the case of the setting that performs the OCR processing, the document being conveyed by the conveyance unit in the case where the determined tilt amount is larger than the first threshold.

5. The image reading apparatus according to claim 1, wherein the one or more controllers are configured to execute, in the case of the setting that performs the OCR processing, skew correction for reducing the tilt amount by rotating the image of the document by the determined tilt amount in a case where the determined tilt amount is not larger than a second threshold which is not larger than the first threshold, and configured to execute the OCR processing with respect to the image data for which the skew correction has been executed, and
wherein the one or more controllers are configured to execute, in the case of the setting that performs the OCR processing, skew correction for reducing the tilt amount by rotating the image of the document by an amount corresponding to the second threshold in a case where the determined tilt amount is larger than the second threshold and the determined tilt amount is not larger than the first threshold, and configured to execute the OCR processing with respect to the image data for which the skew correction has been executed.

6. The image reading apparatus according to claim 1, wherein the one or more controllers are configured to execute, in the case of the setting that performs the OCR processing, skew correction for reducing the tilt amount by rotating the image of the document by the determined tilt amount in a case where the determined tilt amount is not larger than a second threshold which is not larger than the first threshold, and configured to execute the OCR processing with respect to the image data for which the skew correction has been executed, and
wherein the one or more controllers are configured not to execute, in the case of the setting that performs the OCR processing, the skew correction in a case where the determined tilt amount is larger than the second threshold and the determined tilt amount is not larger than the first threshold, and configured to execute the OCR processing with respect to the image data.

7. The image reading apparatus according to claim 1, wherein the one or more controllers are configured not to execute, in the case of the setting that performs the OCR processing, the OCR processing in the case where the determined tilt amount is larger than the first threshold.

* * * * *